US012738551B2

(12) United States Patent
Umemura

(10) Patent No.: US 12,738,551 B2
(45) Date of Patent: Sep. 15, 2026

(54) TECHNIQUE FOR ADJUSTING CHARGING OPERATION OR DISCHARGING OPERATION OF EXTERNAL DEVICE BY BATTERY PACK

(71) Applicant: MAKITA CORPORATION, Anjo (JP)

(72) Inventor: Takuya Umemura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 729 days.

(21) Appl. No.: 18/139,387

(22) Filed: Apr. 26, 2023

(65) Prior Publication Data

US 2023/0369665 A1 Nov. 16, 2023

(30) Foreign Application Priority Data

May 11, 2022 (JP) ................................ 2022-078129

(51) Int. Cl.
*H01M 10/44* (2006.01)
*H01M 10/46* (2006.01)
(Continued)

(52) U.S. Cl.
CPC ....... *H01M 10/486* (2013.01); *H01M 50/569* (2021.01); *H02J 7/975* (2026.01); *G05D 23/24* (2013.01)

(58) Field of Classification Search
CPC .... H02J 7/855; H02J 7/65; H02J 7/865; H02J 7/975; H01M 10/486; H01M 10/433; H01M 10/48; H01M 10/44; H01M 10/482
(Continued)

(56) References Cited

U.S. PATENT DOCUMENTS 6,707,273 B1 * 3/2004 Gignac .................. H02J 7/977 320/137
2006/0001404 A1 1/2006 Ziegler et al.
(Continued)

FOREIGN PATENT DOCUMENTS

CN 114112092 A * 3/2022 .............. G01K 1/20
EP 1 612 907 A2 1/2006
(Continued)

OTHER PUBLICATIONS

Machine translation of JP2019075955A (May 16, 2019) (Year: 2019).*

*Primary Examiner* — Edward Tso
(74) *Attorney, Agent, or Firm* — Oliff PLC

(57) ABSTRACT

One aspect of the present disclosure provides a battery pack including a rechargeable battery, a first power supply terminal, a second power supply terminal, a first signal terminal, a second signal terminal, a positive-side current path, a negative-side current path, a temperature signal generation circuit, a biasing circuit, and a control circuit. The temperature signal generation circuit (i) includes a temperature detection device and (ii) generates a temperature signal across the first signal terminal and the second signal terminal. The temperature detection device has a variable resistance that is dependent on a battery temperature. The temperature signal has a voltage associated with the variable resistance. The biasing circuit biases the voltage of the temperature signal. The voltage biased makes an external device reduce or stop (i) charging from the external device to the rechargeable battery and/or (ii) discharging from the rechargeable battery to the external device.

19 Claims, 23 Drawing Sheets

(51) Int. Cl.

| | |
|---|---|
| ***H01M 10/48*** | (2006.01) |
| ***H01M 50/569*** | (2021.01) |
| ***H02J 7/90*** | (2026.01) |
| *G05D 23/24* | (2006.01) |

(58) Field of Classification Search

USPC ................. 320/107, 114, 115, 132, 150, 153

See application file for complete search history.

(56) References Cited

U.S. PATENT DOCUMENTS

| | | | | |
|---|---|---|---|---|
| 2007/0108941 | A1* | 5/2007 | Sainomoto .............. | H02J 7/663 320/112 |
| 2010/0085012 | A1* | 4/2010 | Cruise ................. | H01M 10/441 320/155 |
| 2016/0268647 | A1 | 9/2016 | Umemura et al. | |
| 2020/0186093 | A1* | 6/2020 | Seong ....................... | H03F 1/22 |

FOREIGN PATENT DOCUMENTS

| | | | | | |
|---|---|---|---|---|---|
| EP | 2244350 | A2 * | 10/2010 | .......... | H01M 10/441 |
| JP | 6416665 | B2 | 10/2018 | | |
| JP | 2019075955 | A * | 5/2019 | | |
| WO | WO-2019014949 | A1 * | 1/2019 | ............ | H02J 7/0048 |

* cited by examiner

TECHNIQUE FOR ADJUSTING CHARGING OPERATION OR DISCHARGING OPERATION OF EXTERNAL DEVICE BY BATTERY PACK

CROSS REFERENCE TO RELATED APPLICATIONS

The present application claims the benefit of Japanese patent application No. 2022-078129 filed with the Japan Patent Office on May 11, 2022 and the entire disclosure of which is incorporated herein by reference.

BACKGROUND

The present disclosure relates to a battery pack.

The Japanese Patent No. 6416665 discloses various examples of battery packs each including a temperature detection circuit. In each of these examples, the temperature detection circuit includes a temperature detection device and a fixed resistor coupled in series or in parallel with the temperature detection device. The temperature detection device has a variable resistance dependent on a battery temperature in the battery pack. When the battery pack is coupled to an external device such as a charger or an electric power tool, the temperature detection circuit is electrically coupled to a power supply circuit in the external device through a pull-up resistor in the external device. The external device receives a voltage across the temperature detection circuit as a temperature signal indicating the battery temperature. The external device performs charging or discharging of a rechargeable battery in the battery pack within an appropriate battery temperature range for the rechargeable battery while detecting the battery temperature based on the temperature signal.

SUMMARY

In general, an upper limit and a lower limit of a battery temperature for charging or discharging a rechargeable battery are fixed in an external device. However, an appropriate range of the battery temperature for charging or discharging can be different depending on types of the rechargeable batteries. Therefore, the upper limit of the battery temperature in the external device can exceed the appropriate range of the battery temperature for a rechargeable battery in a battery pack coupled to the external device. Alternatively, the lower limit of the battery temperature in the external device can be lower than the appropriate range of the battery temperature for a rechargeable battery in a battery pack coupled to the external device. Each of the examples of the above-described battery packs merely outputs a temperature signal to the external device, and cannot make the external device stop charging or discharging when the battery temperature deviates from the appropriate range of the battery temperature for the rechargeable battery.

In one aspect of the present disclosure, it is desirable to provide a technique for adjusting a charging operation or a discharging operation of an external device by a battery pack.

In this disclosure, it should be noted that the terms such as "first" and "second" are intended simply to distinguish elements from each other, and are not intended to limit the order or the number of the elements. The first element may be referred to as the second element, and similarly, the second element may be referred to as the first element. In addition, the first element may be included without the second element, and similarly, the second element may be included without the first element.

One aspect of the present disclosure provides a battery pack including a rechargeable battery, a first power supply terminal, a second power supply terminal, a first signal terminal, a second signal terminal, a positive-side current path, a negative-side current path, a temperature signal generation circuit, a biasing circuit, and a control circuit.

The rechargeable battery includes (i) a positive electrode, (ii) a negative electrode, and (iii) at least one battery cell. The first power supply terminal is configured to be detachably coupled to a positive electrode terminal of an external device. The second power supply terminal is configured to be detachably coupled to a negative electrode terminal of the external device. The first signal terminal is configured to be detachably coupled to a first corresponding terminal of the external device. The second signal terminal is configured to be detachably coupled to a second corresponding terminal of the external device. The positive-side current path (i) electrically couples the first power supply terminal to the positive electrode of the rechargeable battery or (ii) is configured to electrically couple the first power supply terminal to the positive electrode of the rechargeable battery. The negative-side current path (i) electrically couples the second power supply terminal to the negative electrode of the rechargeable battery or (ii) is configured to electrically couple the second power supply terminal to the negative electrode of the rechargeable battery. The temperature signal generation circuit (i) includes a temperature detection device and (ii) is configured to generate a temperature signal across the first signal terminal and the second signal terminal. The temperature detection device has a variable resistance that is dependent on a battery temperature. The temperature signal has a voltage associated with the variable resistance. The battery temperature corresponds to a temperature of (i) the rechargeable battery or (ii) the at least one battery cell. The biasing circuit is configured to bias the voltage of the temperature signal. The voltage biased makes the external device reduce or stop (i) charging from the external device to the rechargeable battery and/or (ii) discharging from the rechargeable battery to the external device. The control circuit is configured to operate the biasing circuit based on a battery status. The battery status corresponds to (i) a status of the rechargeable battery and/or (ii) a status of the at least one battery cell.

In the battery pack as thus configured, the control circuit operates the biasing circuit based on the battery status to make the external device reduce or stop (i) charging from the external device to the rechargeable battery and/or (ii) discharging from the rechargeable battery to the external device.

Accordingly, the battery pack can adjust a charging operation or a discharging operation of the external device.

Another aspect of the present disclosure provides a method for adjusting charging and/or discharging between a battery pack and an external device, the method including:

outputting a temperature signal from the battery pack to the external device, the temperature signal having a voltage associated with a variable resistance of a temperature detection device in the battery pack, the variable resistance being dependent on a temperature of (i) a rechargeable battery in the battery pack or (ii) at least one battery cell in the rechargeable battery, and the external device being coupled to the battery pack; and biasing the voltage of the temperature signal based on (i) a status of the rechargeable battery and/or (ii) a status of the at least one battery cell, wherein the voltage biased makes the external device reduce or stop (i) charging from the external device to the rechargeable battery and/or (ii) discharging from the rechargeable battery to the external device.

According to this method, a charging operation or a discharging operation of the external device can be adjusted by the battery pack.

BRIEF DESCRIPTION OF DRAWINGS

Example embodiments of the present disclosure will be described hereinafter by way of example with reference to the accompanying drawings, in which.

DETAILED DESCRIPTION OF EXEMPLARY EMBODIMENTS

1. Overview of Embodiments

Figure 1:
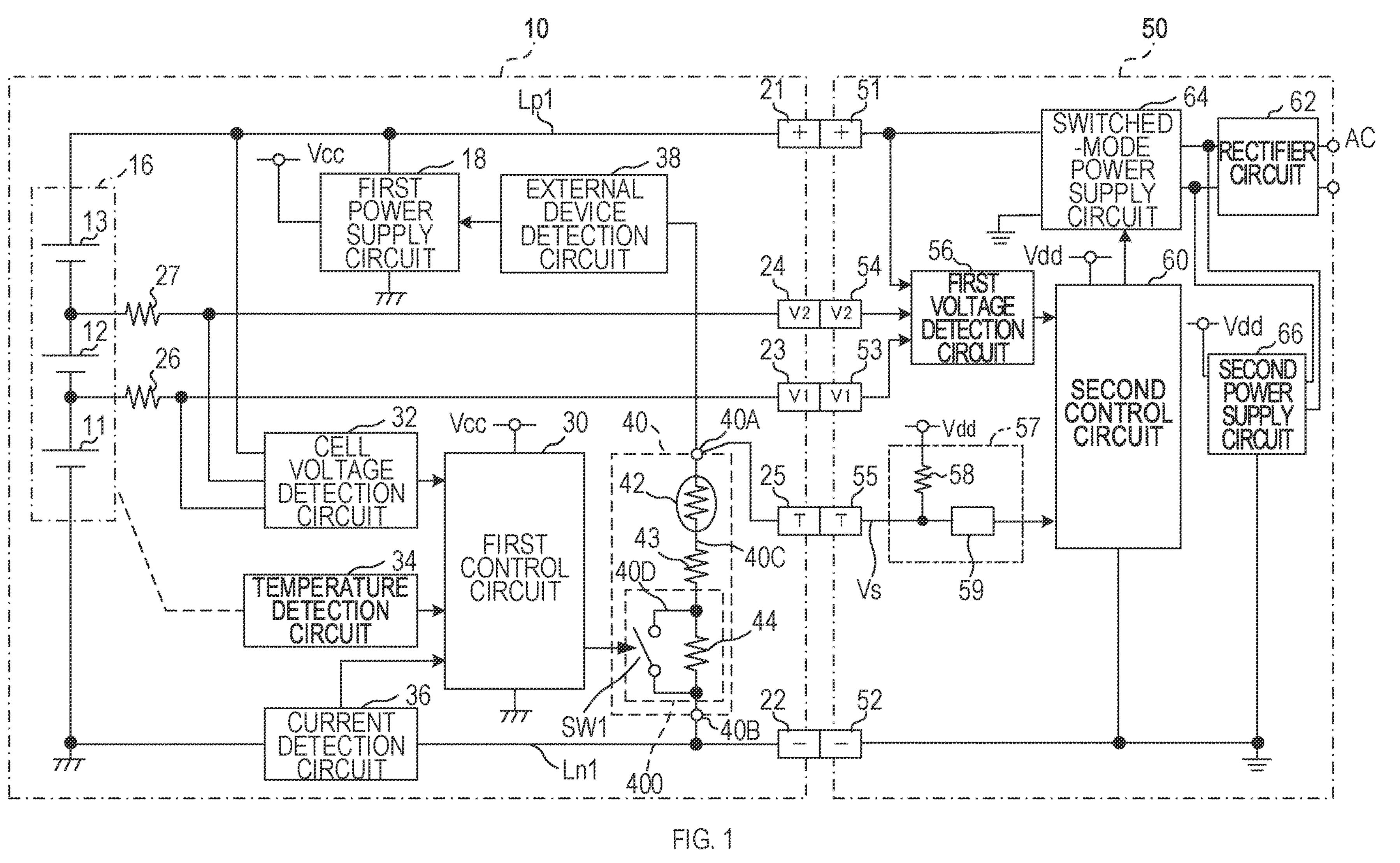
FIG. 1 is a block diagram showing circuit configurations of a battery pack and a charger in a first embodiment.

One embodiment may provide a battery pack including at least any one of:

Feature 1: a rechargeable battery including (i) a positive electrode, (ii) a negative electrode, and (iii) at least one battery cell;

Feature 2: a first power supply terminal configured to be detachably coupled to a positive electrode terminal of an external device;

Feature 3: a second power supply terminal configured to be detachably coupled to a negative electrode terminal of the external device;

Feature 4: a first signal terminal configured to be detachably coupled to a first corresponding terminal of the external device;

Feature 5: a second signal terminal configured to be detachably coupled to a second corresponding terminal of the external device;

Feature 6: a positive-side current path (i) electrically coupling the first power supply terminal to the positive electrode of the rechargeable battery or (ii) configured to electrically couple the first power supply terminal to the positive electrode of the rechargeable battery;

Feature 7: a negative-side current path (i) electrically coupling the second power supply terminal to the negative electrode of the rechargeable battery or (ii) configured to electrically couple the second power supply terminal to the negative electrode of the rechargeable battery;

Feature 8: a temperature signal generation circuit (i) including a temperature detection device and (ii) configured to generate a temperature signal across the first signal terminal and the second signal terminal;

Feature 9: the temperature detection device has a variable resistance that is dependent on a battery temperature;

Feature 10: the temperature signal has a voltage associated with the variable resistance;

Feature 11: the battery temperature corresponds to a temperature of (i) the rechargeable battery or (ii) the at least one battery cell;

Feature 12: a biasing circuit (or a bias circuit) configured to bias the voltage of the temperature signal;

Feature 13: the voltage biased makes the external device reduce or stop (i) charging from the external device to the rechargeable battery and/or (ii) discharging from the rechargeable battery to the external device;

Feature 14: a control circuit configured to operate the biasing circuit based on a battery status; and Feature 15: the battery status corresponds to (i) a status of the rechargeable battery and/or (ii) a status of the at least one battery cell.

The battery pack including at least features 1 through 15 can adjust a charging operation or a discharging operation of the external device by biasing the voltage of the temperature signal based on the battery status.

One embodiment may include, in addition to or in place of at least any one of features 1 through 15, at least any one of:

Feature 16: the temperature signal generation circuit includes a pair of terminals (i) respectively coupled to the first signal terminal and the second signal terminal and (ii) configured to receive an input voltage across the pair of terminals at least through a voltage dividing resistor;

Feature 17: the input voltage is divided by at least (i) the voltage dividing resistor and (ii) an electrical resistance of the temperature signal generation circuit across the pair of terminals;

Feature 18: the electrical resistance is associated with the variable resistance;

Feature 19: the temperature signal generation circuit is configured to generate the temperature signal having the voltage based on the electrical resistance in response to an electric current flowing across the pair of terminals through the temperature detection device;

Feature 20: the biasing circuit is configured to vary (or change) the electrical resistance across the pair of terminals to thereby bias the voltage of the temperature signal.

The battery pack including at least features 1 through 20 can bias the voltage of the temperature signal by varying the electrical resistance across the pair of terminals.

One embodiment may include, in addition to or in place of at least any one of features 1 through 20, Feature 21: the external device includes (i) the voltage dividing resistor and/or (ii) a power supply configured to apply the input voltage across the pair of terminals through the voltage dividing resistor, the first corresponding terminal, and the second corresponding terminal.

One embodiment may include, in addition to or in place of at least any one of features 1 through 21, at least any one of:

Feature 22: the temperature signal generation circuit includes a first current path electrically coupling the pair of terminals with one another; and Feature 23: the temperature detection device is on the first current path.

One embodiment may include, in addition to or in place of at least any one of features 1 through 23, at least any one of:

Feature 24: the biasing circuit includes a first resistor (i) on the first current path and (ii) coupled in series with the temperature detection device; and Feature 25: the biasing circuit is configured to vary the electrical resistance across the pair of terminals at least with the first resistor.

One embodiment may include, in addition to or in place of at least any one of 1 through 25, at least any one of:

Feature 26: the biasing circuit includes a second current path coupled in parallel with the first resistor;

Feature 27: the biasing circuit includes a first switch (i) on the second current path and (ii) configured to be switched between an on-state and an off-state;

Feature 28: the first switch in the on-state is configured to complete the second current path;

Feature 29: the first switch in the off-state is configured to interrupt the second current path; and Feature 30: the control circuit is configured to switch the first switch either to the on-state or to the off-state based on the battery status.

The battery pack including at least features 1 through 20 and 22 through 30 can bias the voltage of the temperature signal by switching the first switch between the on-state and the off-state.

One embodiment may include, in addition to or in place of at least any one of features 1 through 30, at least any one of:

Feature 31: the control circuit is configured to switch the first switch to the on-state at least based on the battery temperature being outside a first temperature range;

Feature 32: the control circuit is configured to switch the first switch to the off-state at least based on the battery temperature being within the first temperature range; and Feature 33: a combined resistance of the temperature detection device and the first resistor, when (i) the battery temperature is within the first temperature range and (ii) the first switch is in the off-state, is set such that the temperature signal has the voltage that makes the external device (i) stop charging from the external device to the rechargeable battery or (ii) reduce its charging rate from the external device to the rechargeable battery.

The battery pack including at least features 1 through 20 and 22 through 33 can make the external device stop charging from the external device to the rechargeable battery or reduce its charging rate from the external device to the rechargeable battery, at least when the battery temperature is within the first temperature range.

One embodiment may include, in addition to or in place of at least any one of features 1 through 33, at least any one of:

Feature 34: the control circuit is configured to switch the first switch to the on-state at least based on the battery temperature being outside (i) the first temperature range and (ii) a second temperature range;

Feature 35: the control circuit is configured to switch the first switch to the off-state at least based on the battery temperature being within the second temperature range;

Feature 36: the second temperature range is distinct from the first temperature range;

Feature 37: the combined resistance of the temperature detection device and the first resistor, when (i) the battery temperature is within the first temperature range and (ii) the first switch is in the off-state, is set such that the temperature signal has the voltage that makes the external device stop charging from the external device to the rechargeable battery;

Feature 38: the combined resistance of the temperature detection device and the first resistor, when (i) the battery temperature is within the second temperature range and (ii) the first switch is in the off-state, is set such that the temperature signal has the voltage that makes the external device reduce its charging rate from the external device to the rechargeable battery.

The battery pack including at least features 1 through 20 and 22 through 38 can make the external device stop charging from the external device to the rechargeable battery at least when the battery temperature is within the first temperature range. In addition, this battery pack can make the external device reduce its charging rate from the external device to the rechargeable battery at least when the battery temperature is within the second temperature range.

One embodiment may include, in addition to or in place of at least any one of features 1 through 38, at least any one of:

Feature 39: the biasing circuit includes a third current path (i) distinct from the second current path and (ii) coupled in parallel with the first resistor;

Feature 40: the biasing circuit includes a second resistor on the third current path;

Feature 41: the biasing circuit includes a second switch (i) coupled in series with the second resistor on the third current path and (ii) configured to be switched between an on-state and an off-state;

Feature 42: the second switch in the on-state is configured to complete the third current path;

Feature 43: the second switch in the off-state is configured to interrupt the third current path; and Feature 44: the control circuit is configured to (i) switch the first switch either to the on-state or to the off-state and (ii) switch the second switch either to the on-state or to the off-state, based on the battery status.

The battery pack including at least features 1 through 20, 22 through 30, and 39 through 44 can bias the voltage of the temperature signal by individually switching the first switch and the second switch between their respective on-states and off-states.

One embodiment may include, in addition to or in place of at least any one of features 1 through 44, at least any one of:

Feature 45: the control circuit is configured to (i) switch the first switch to the on-state and (ii) switch the second switch either to the on-state or to the off-state, at least based on the battery temperature being within a third temperature range;

Feature 46: the control circuit is configured to (i) switch the first switch to the off-state and (ii) switch the second switch to the on-state, at least based on the battery temperature being within a fourth temperature range;

Feature 47: the control circuit is configured to switch the first switch and the second switch to their respective off-states at least based on the battery temperature being within a fifth temperature range;

Feature 48: the third temperature range, the fourth temperature range, and the fifth temperature range are distinct from one another;

Feature 49: a combined resistance of the temperature detection device, the first resistor, and the second resistor, when (i) the battery temperature is within the fourth temperature range, (ii) the first switch is in the off-state, and (iii) the second switch is in the on-state, is set such that the temperature signal has the voltage that makes the external device reduce its charging rate from the external device to the rechargeable battery; and Feature 50: a combined resistance of the temperature detection device and the first resistor, when (i) the battery temperature is within the fifth temperature range and (ii) the first switch and the second switch are in their respective off-states, is set such that the temperature signal has the voltage that makes the external device stop charging from the external device to the rechargeable battery.

The battery pack including at least features 1 through 20, 22 through 30, and 39 through 50 can make the external device recognize an actual battery temperature at least when the battery temperature is within the third temperature range. In addition, this battery pack can make the external device reduce its charging rate from the external device to the rechargeable battery at least when the battery temperature is within the fourth temperature range. Further, this battery pack can make the external device stop charging from the external device to the rechargeable battery at least when the battery temperature is within the fifth temperature range.

One embodiment may include, in addition to or in place of at least any one of features 1 through 50, Feature 51: the control circuit is configured to switch the second switch to the on-state and subsequently switch the first switch to the off-state, at least based on the battery temperature being within the fourth temperature range.

The battery pack including at least features 1 through 20, 22 through 30, and 39 through 51 can avoid the first switch and the second switch to be simultaneously switched to their respective off-states and therefore can prevent the battery pack itself from erroneously making the external device stop charging from the external device to the rechargeable battery, at least when the battery temperature is within the fourth temperature range.

One embodiment may include, in addition to or in place of at least any one of features 1 through 51, at least any one of:

Feature 52: the biasing circuit includes a fourth current path coupled in parallel with the first current path;

Feature 53: the biasing circuit includes a third resistor on the fourth current path;

Feature 54: the biasing circuit includes a third switch (i) coupled in series with the third resistor on the fourth current path and (ii) configured to be switched between an on-state and an off-state;

Feature 55: the third switch in the on-state is configured to complete the fourth current path;

Feature 56: the third switch in the off-state is configured to interrupt the fourth current path; and Feature 57: the control circuit is configured to switch the third switch either to the on-state or to the off-state based on the battery status.

The battery pack including at least features 1 through 20, 22 through 25, and 52 through 57 can bias the voltage of the temperature signal by switching the third switch between the on-state and the off-state.

One embodiment may include, in addition to or in place of at least any one of features 1 through 57, at least any one of:

Feature 58: the control circuit is configured to switch the third switch to the off-state at least based on the battery temperature being outside a sixth temperature range;

Feature 59: the control circuit is configured to switch the third switch to the on-state at least based on the battery temperature being within the sixth temperature range; and Feature 60: a combined resistance of the temperature detection device, the first resistor, and the third resistor, when (i) the battery temperature is within the sixth temperature range and (ii) the third switch is in the on-state, is set such that the temperature signal has the voltage that makes the external device reduce its charging rate from the external device to the rechargeable battery.

The battery pack including at least features 1 through 20, 22 through 25, and 52 through 60 can make the external device reduce its charging rate from the external device to the rechargeable battery at least when the battery temperature is within the sixth temperature range.

One embodiment may include, in addition to or in place of at least any one of features 1 through 60, Feature 61: the temperature detection device (i) has a negative temperature coefficient and (ii) is configured such that the variable resistance decreases in accordance with an increase in the battery temperature.

One embodiment may include, in addition to or in place of at least any one of features 1 through 60, Feature 62: the temperature detection device (i) has a positive temperature coefficient and (ii) is configured such that the variable resistance increases in accordance with an increase in the battery temperature.

One embodiment may include, in addition to or in place of at least any one of features 1 through 60, Feature 63: the temperature detection device is configured such that the variable resistance significantly decreases in response to the battery temperature having exceeded a predetermined temperature.

One embodiment may include, in addition to or in place of at least any one of features 1 through 63, at least any one of:

Feature 64: the negative electrode terminal of the external device is common with the second corresponding terminal of the external device; and Feature 65: the second power supply terminal of the battery pack is common with the second signal terminal of the battery pack.

The battery pack including at least features 1 through 15, 64, and 65 can reduce the number of terminals in the battery pack, which can contribute to the simplification and/or downsizing of the battery pack.

One embodiment may include, in addition to or in place of at least any one of features 1 through 65, at least any one of:

Feature 66: the temperature detection circuit configured to detect the battery temperature; and Feature 67: the battery status includes the battery temperature detected by the temperature detection circuit.

The battery pack including at least features 1 through 15, 66, and 67 can bias the voltage of the temperature signal based on the battery temperature detected by the temperature detection circuit.

One embodiment may include, in addition to or in place of at least any one of features 1 through 67, at least any one of:

Feature 68: a voltage detection circuit configured to detect a battery voltage;

Feature 69: the battery voltage corresponds to a voltage of (i) the rechargeable battery or (ii) the at least one battery cell; and Feature 70: the battery status includes the battery voltage detected by the voltage detection circuit.

The battery pack including at least features 1 through 15 and 68 through 70 can bias the voltage of the temperature signal based on the battery voltage detected by the voltage detection circuit.

One embodiment may include, in addition to or in place of at least any one of features 1 through 70, Feature 71: the external device is (i) a charger or (ii) a battery-operated device (or a battery-powered device, or a battery-driven device).

Examples of the battery-operated device include any types of battery-operated job site electric devices or battery-operated job site electric equipment that are used at job sites, for example, of do-it-yourself carpentry, manufacturing, gardening, and construction. Specifically, examples of the battery-operated device may include an electric power tool for masonry work, metalworking, or woodworking, a work machine for gardening, or a device for preparing an environment of a job site. More specifically, examples of the battery-operated device may include an electric blower, an electric hammer, an electric hammer drill, an electric drill, an electric driver, an electric wrench, an electric grinder, an electric circular saw, an electric reciprocating saw, an electric jig saw, an electric cutter, an electric chain saw, an electric planer, an electric nailer (including an electric tacker), an electric hedge trimmer, an electric lawn mower, an electric lawn trimmer, an electric bush cutter, an electric cleaner, an electric sprayer, an electric spreader, an electric dust collector, a laser range finder (or a laser distance measuring equipment), a laser marking device (or a laser level), an electric beam receiver of a laser marking device, a wall scanner, a radio, a television, a speaker, an electric hot/cool storage, an electric kettle, a coffee machine (or a coffee maker or a coffee distiller), a micro wave oven, a robotic vacuum (or a robot vacuum), a battery-operated wheel barrow, a battery-operated bicycle, a fan best, and a heating jacket.

In one embodiment, the control circuit may be integrated into a single electronic unit, a single electronic device, or a single circuit board.

In one embodiment, the control circuit may be a combination of two or more electronic circuits, or a combination of two or more electronic units, or a combination of two or more electronic devices, each of which is individually disposed on the battery pack or inside the battery pack.

In one embodiment, the control circuit may include a microcomputer (or a microcontroller, or a microprocessor), a wired logic, an application-specific integrated circuit (ASIC), an application-specific standard product (ASSP), a programmable logic device (such as a field programmable gate array (FPGA)), a discrete electronic component, and/or a combination of the above.

In one embodiment, each of the first through third switches may be a semiconductor switch or a mechanical relay. Examples of the semiconductor switch include a field effect transistor (FET), a bipolar transistor, an insulated gate bipolar transistor (IGBT) and a solid-state relay (SSR).

In one embodiment, each of the first to third resistors and the voltage dividing resistor may be a single resistor or a combination of two or more resistors coupled in series or in parallel with one another.

In one embodiment, the temperature detection device may be a resistance thermometer. Examples of the resistance thermometer include a positive temperature coefficient (PTC) thermistor, a negative temperature coefficient (NTC) thermistor, and a critical temperature resistor (CTR) thermistor.

One embodiment may provide a method including at least any one of:

Feature 72: outputting a temperature signal from a battery pack to an external device;

Feature 73: the temperature signal has a voltage associated with a variable resistance of a temperature detection device in the battery pack;

Feature 74: the variable resistance is dependent on a temperature of (i) a rechargeable battery in the battery pack or (ii) at least one battery cell in the rechargeable battery;

Feature 75: the external device is coupled to the battery pack;

Feature 76: biasing the voltage of the temperature signal based on (i) a status of the rechargeable battery and/or (ii) a status of the at least one battery cell; and Feature 77: the voltage biased makes the external device reduce or stop (i) charging from the external device to the rechargeable battery and/or (ii) discharging from the rechargeable battery to the external device.

According to the method including at least features 72 through 77, a charging operation or a discharging operation of the external device can be adjusted by the battery pack.

In one embodiment, features 1 through 77 may be combined in any way.

In one embodiment, any of features 1 through 77 may be excluded.

2. Specific Example Embodiments

Some specific example embodiments are described below.

2-1. First Embodiment

As shown in FIG. 1, a first embodiment provides a battery pack 10 configured to be detachably coupled to a charger 50. As described later, the battery pack 10 is also configured to be detachably coupled to a battery-operated device, such as an electric power tool 80 which is described later (see FIG. 19).

2-1-1. Circuit Configuration of Battery Pack

The battery pack 10 includes a rechargeable battery 16. The battery 16 includes at least one rechargeable battery cell, such as a lithium ion battery cell. In the first embodiment, the battery 16 includes first through third battery cells 11-13 coupled in series in this order. In this configuration of the battery 16, the negative electrode of the first battery cell 11 corresponds to the negative electrode of the battery 16, and the positive electrode of the third battery cell 13 corresponds to the positive electrode of the battery 16. The negative electrode of the battery 16 is coupled to the ground of the battery pack 10 and therefore provides the electric reference potential (i.e. zero volts) for the internal circuits in the battery pack 10. The first through third battery cells 11-13 in the first embodiment have (i) the same or similar temperature characteristics and (ii) the same or similar electrical characteristics.

The battery pack 10 includes a first power supply terminal 21. The battery pack 10 includes a first positive-side current path Lp1 that electrically couples the first power supply terminal 21 to the positive electrode of the battery 16. The battery pack 10 includes a second power supply terminal 22. The battery pack 10 includes a first negative-side current path Ln1 that electrically couples the second power supply terminal 22 to the negative electrode of the battery 16. The battery pack 10 includes a first voltage output terminal 23. The first voltage output terminal 23 is electrically coupled to the positive electrode of the first battery cell 11 and the negative electrode of the second battery cell 12 through a first current-limiting resistor 26. The first voltage output terminal 23 outputs a first voltage signal indicating a voltage of the first battery cell 11. The battery pack 10 includes a second voltage output terminal 24. The second voltage output terminal 24 is electrically coupled to the positive electrode of the second battery cell 12 and the negative electrode of the third battery cell 13 through a second current-limiting resistor 27. The second voltage output terminal 24 outputs a second voltage signal indicating a voltage of the second battery cell 12. The battery pack 10 includes a first signal output terminal 25 described later in detail.

The battery pack 10 includes a first power supply circuit 18. The first power supply circuit 18 receives a voltage across the battery 16 (hereinafter, referred to as "battery voltage") and generates a first supply voltage Vcc for operating the internal circuits in the battery pack 10. The first supply voltage Vcc in the first embodiment is a fixed direct voltage.

The battery pack 10 includes a cell voltage detection circuit 32. The cell voltage detection circuit 32 detects (i) the magnitude of the battery voltage and (ii) the respective magnitudes of the voltages of the first through third battery cells 11-13 (i.e. cell voltages). The cell voltage detection circuit 32 also outputs a first battery voltage detection signal indicating (i) the magnitude of the battery voltage and (ii) the respective magnitudes of the cell voltages.

The battery pack 10 includes a temperature detection circuit 34. The temperature detection circuit 34 detects a temperature of (i) the battery 16 or (ii) at least one of the first through third battery cells 11-13 (hereinafter, referred to as "battery temperature") and outputs a battery temperature monitoring signal. The battery temperature monitoring signal indicates a battery temperature. The temperature detection circuit 34 in the first embodiment includes a thermistor (not shown) and a resistor (not shown) coupled in series with one another. This thermistor is on or in the vicinity of the battery 16 (more specifically, at least any one of the first through third battery cells 11-13).

The battery pack 10 includes a current detection circuit 36 on the first negative-side current path Ln1. The current detection circuit 36 detects an electric current (that is, a charging current or a discharging current) flowing through the first negative-side current path Ln1 and outputs a current detection signal. The current detection signal has a voltage corresponding to (i) the magnitude of the electric current detected and (ii) the direction of the electric current detected. In the first embodiment, the current detection signal detecting the charging current has a positive voltage, while the current detection signal detecting the discharging current has a negative voltage.

The battery pack 10 includes a temperature signal generation circuit 40. The temperature signal generation circuit 40 includes a first terminal 40A, a second terminal 40B, a first current path 40C, a temperature detection device 42, an inserted resistor 43, and a biasing circuit 400.

The first terminal 40A is electrically coupled to the first signal output terminal 25. The second terminal 40B is electrically coupled to the second power supply terminal 22 through the first negative-side current path Ln1. The first current path 40C electrically couples the first terminal 40A to the second terminal 40B through the temperature detection device 42, the inserted resistor 43, and biasing circuit 400 in this order. The temperature detection device 42 is on or in the vicinity of the battery 16 (more specifically, at least any one of the first through third battery cells 11-13).

The biasing circuit 400 includes a first serial resistor 44 on the first current path 40C, a second current path 40D coupled in parallel with the first serial resistor 44, and a first switch SW1 on the second current path 40D. The first switch SW1 is configured to be switched between an on-state and an off-state. The first switch SW1 in the first embodiment is an FET. In other embodiments, the first switch SW1 may be a semiconductor switch in any other form, including a bipolar transistor, an IGBT, and an SSR, or may be a mechanical relay.

When the first switch SW1 is in the off-state, the second current path 40D is interrupted. In this state, a resistance Rs across the first terminal 40A and the second terminal 40B (i.e., the resistance Rs of the temperature signal generation circuit 40) is equivalent to or approximate to the sum of (i) a resistance Rm of the temperature detection device 42, (ii)

a resistance Ra of the inserted resistor 43, and (iii) a resistance R1 of the first serial resistor 44 (that is, $Rs=Rm+Ra+R1$ or Rs Rm+Ra+R1).

When the first switch SW1 is in the on-state, the first serial resistor 44 is short-circuited through the second current path 40D. In this state, the resistance Rs of the temperature signal generation circuit 40 is equivalent to or approximate to the sum of (i) the resistance Rm of the temperature detection device 42 and (ii) the resistance Ra of the inserted resistor 43 (that is, $Rs=Rm+Ra$, or Rs Rm+Ra).

In an external device such as the charger 50, a second supply voltage Vdd described later is applied to a first signal input terminal 55 through a first pull-up resistor 58.

While the battery pack 10 is coupled to the external device, the electric current flows from the first signal input terminal 55 into the temperature signal generation circuit 40 through the first signal output terminal 25, and a temperature signal is generated across the first terminal 40A and the second terminal 40B. The generated temperature signal is output to the external device through the first signal output terminal 25 and the second power supply terminal 22. In other embodiments, a not-shown second signal output terminal may be added to the battery pack 10, and the second terminal 40B may be coupled to the second signal output terminal instead of the second power supply terminal 22. In this case, the temperature signal is output to the external device through the first signal output terminal 25 and the second signal output terminal. In the first embodiment, the second power supply terminal 22 serves as the second signal output terminal (that is, the second power supply terminal 22 is common with the second output terminal).

The temperature signal has a voltage Vs that varies in accordance with the resistance Rs of the temperature signal generation circuit 40. More specifically, the voltage Vs is equal to or approximate to the second supply voltage Vdd divided by (i) a resistance R0 of the first pull-up resistor 58 and (ii) the resistance Rs of the temperature signal generation circuit 40 (that is, $Vs=Vdd\times Rs/(R0+Rs)$, or $Vs\approx Vdd\times Rs/(R0+Rs)$).

The resistance Rs when the first switch SW1 is in the off-state is larger than the resistance Rs when the first switch SW1 is in the on-state. Therefore, the voltage Vs increases in response to the first switch SW1 being switched from the on-state to the off-state.

The temperature detection device 42 in the first embodiment is an NTC thermistor. Thus, the resistance Rm of the temperature detection device 42, i.e. the resistance Rs of the temperature signal generation circuit 40 decreases with an increase in the battery temperature.

In response to the first switch SW1 being switched from the on-state to the off-state, the resistance Rs, and thus, the voltage Vs increases. With the temperature signal having the voltage Vs biased in this way, the external device recognizes a decreased battery temperature.

In other embodiments, the temperature detection device 42 may be a resistance thermometer of any other types, including a PTC thermistor and a CTR thermistor. When the temperature detection device 42 is the PTC thermistor, the resistance Rm and the resistance Rs increase with the increase in the battery temperature. When the temperature detection device 42 is the CTR thermistor, the resistance Rm and the resistance Rs significantly decrease in response to the battery temperature having exceeded a predetermined temperature.

The battery pack 10 includes a first control circuit 30. The first control circuit 30 in the first embodiment includes a microcomputer including a CPU, a ROM, a RAM, and the like. In other embodiments, in addition to or in place of the microcomputer, the first control circuit 30 may include a wired logic, an ASIC, an ASSP, a programmable logic device, a discrete electronic component, and/or a combination of these.

The first control circuit 30 recognizes a state of the battery 16 based on the signals output from the cell voltage detection circuit 32, the temperature detection circuit 34, and the current detection circuit 36. Specifically, the first control circuit 30 recognizes (i) the magnitude of the battery voltage, (ii) the respective magnitudes of the cell voltages of the first through third battery cells 11-13, (iii) the battery temperature, (iv) the magnitude of the charging current flowing into the battery 16, and (v) the magnitude of the discharging current flowing from the battery 16.

The first control circuit 30 turns on or off the first switch SW1 of the biasing circuit 400 based on the recognized state of the battery 16 to thereby vary (or change) the battery temperature recognized by the external device. In the first embodiment, the first control circuit 30 turns on or off the first switch SW1 based on the battery temperature as described in detail later.

The battery pack 10 includes an external device detection circuit 38. The external device detection circuit 38 is electrically coupled to the first signal output terminal 25. The external device detection circuit 38 detects that the battery pack 10 is coupled to the external device based on a voltage being applied from the external device to the first signal output terminal 25.

While detecting that the battery pack 10 is coupled to the external device, the external device detection circuit 38 outputs an external device detection signal to the first power supply circuit 18. While receiving the external device detection signal, the first power supply circuit 18 generates the first supply voltage Vcc. The first control circuit 30 operates with the first supply voltage Vcc generated.

2-1-2. Circuit Configuration of Charger

The charger 50 includes a first positive electrode terminal 51. The first power supply terminal 21 of the battery pack 10 is configured to be detachably coupled to the first positive electrode terminal 51.

The charger 50 includes a first negative electrode terminal 52. The second power supply terminal 22 of the battery pack 10 is configured to be detachably coupled to the first negative electrode terminal 52. The first negative electrode terminal 52 is electrically coupled to the ground of the charger 50. When the second power supply terminal 22 is coupled to the first negative electrode terminal 52, the ground of the battery pack 10 (that is, the negative electrode of the battery 16) is electrically coupled to the ground of the charger 50. As a result, the internal circuits in the battery pack 10 and in the charger 50 share the same electrical reference potential.

The charger 50 includes a first voltage input terminal 53. The first voltage output terminal 23 of the battery pack 10 is configured to be detachably coupled to the first voltage input terminal 53.

The charger 50 includes a second voltage input terminal 54. The second voltage output terminal 24 of the battery pack 10 is configured to be detachably coupled to the second voltage input terminal 54.

The charger 50 includes the above-described first signal input terminal 55. The first signal output terminal 25 of the battery pack 10 is configured to be detachably coupled to the first signal input terminal 55.

The charger 50 includes a first voltage detection circuit 56. The first voltage detection circuit 56 receives each voltage on the first positive electrode terminal 51, the first voltage input terminal 53, and the second voltage input terminal 54 and outputs a second battery voltage detection signal. The second battery voltage detection signal indicates (i) the magnitude of the battery voltage and (ii) the respective magnitudes of the cell voltages.

The charger 50 includes a first temperature signal reception circuit 57. The first temperature signal reception circuit 57 includes a first filter circuit 59 in addition to the first pull-up resistor 58. When the battery pack 10 is coupled to the charger 50, the first filter circuit 59 receives the temperature signal from the temperature signal generation circuit 40 of the battery pack 10 through the first signal output terminal 25 and the first signal input terminal 55. The first filter circuit 59 removes a noise component (e.g. a high frequency component higher than or equal to a predetermined frequency) from the received temperature signal and outputs the temperature signal without the noise component.

The charger 50 includes a rectifier circuit 62. The rectifier circuit 62 receives an alternating voltage (e.g., AC 100 volts or AC 120 volts or AC 230 volts) supplied from an external AC power supply (generally, AC mains). The rectifier circuit 62 converts the received alternating voltage into a direct voltage and outputs the direct voltage.

The charger 50 includes a switched-mode power supply circuit 64. The switched-mode power supply circuit 64 includes a not-shown switching regulator. The switched-mode power supply circuit 64 receives the direct voltage from the rectifier circuit 62. The switched-mode power supply circuit 64 reduces (or steps-down) the received direct voltage with the switching regulator and output to the first positive electrode terminal a charging voltage for charging the battery 16.

The charger 50 includes a second power supply circuit 66. The second power supply circuit 66 receives the direct voltage from the rectifier circuit 62. The second power supply circuit 66 reduces (or steps-down) the received direct voltage and generates the second supply voltage Vdd for operating the internal circuits in the charger 50. The second supply voltage Vdd in the first embodiment is a fixed direct voltage.

In the first embodiment, the switched-mode power supply circuit 64 and the second power supply circuit 66 are isolation power supply circuits isolating between their respective primary sides (or their respective inputs) and their respective secondary sides (or their respective outputs). Accordingly, in the first embodiment, the charging voltage and the second supply voltage Vdd are isolated from the alternating voltage. In the other embodiments, the switched-mode power supply circuit 64 and/or the second power supply circuit 66 may be non-isolation power supply circuits not isolating between their respective primary sides (or their respective inputs) and their respective secondary sides (or their respective outputs).

The charger 50 includes a second control circuit 60. The second control circuit 60 in the first embodiment includes a microcomputer including a CPU, a ROM, a RAM, and the like similarly to the first control circuit 30 of the battery pack 10. In other embodiments, in addition to or in place of the microcomputer, the second control circuit 60 may include a wired logic, an ASIC, an ASSP, a programmable logic device, a discrete electronic component, and/or a combination of these.

The second control circuit 60 receives, from the first temperature signal reception circuit 57, the temperature signal without the noise component. Based on the received temperature signal, the second control circuit 60 recognizes that the battery pack 10 is coupled to the charger 50.

The second control circuit 60 also recognizes the battery temperature based on the received temperature signal. The second control circuit 60 controls the switched-mode power supply circuit 64 so that the charger 50 performs a charging operation (or a charging control) corresponding to the battery temperature recognized.

2-1-3. Outline of Charging Operation in Charger

Figure 2:
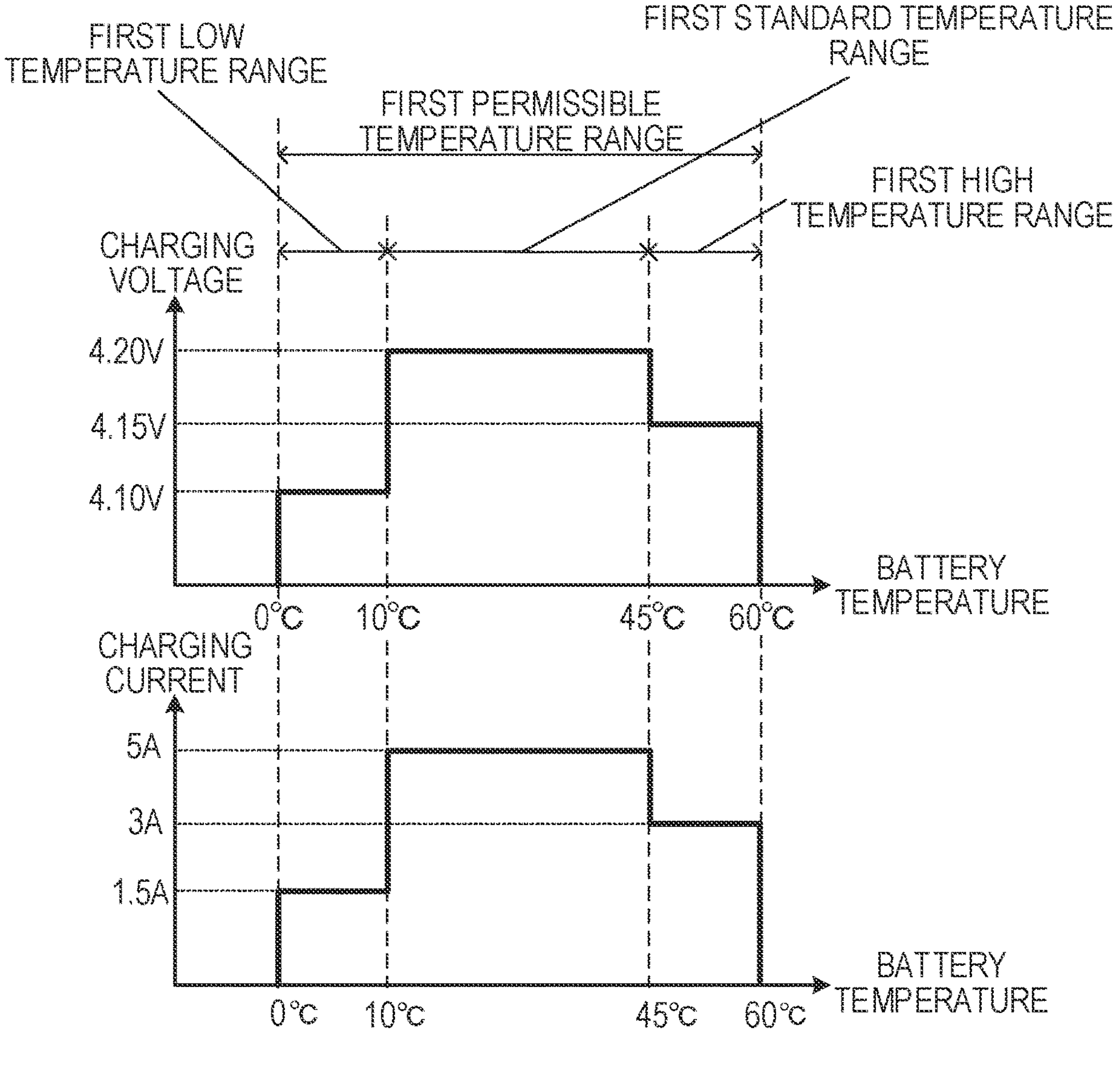
FIG. 2 schematically shows a charging operation of the charger.

As shown in FIG. 2, the charger 50 (more specifically, the second control circuit 60) is set (i) to perform charging of the battery 16 when the battery temperature is within a first permissible temperature range (ranging from 0 degrees Celsius to 60 degrees Celsius in the first embodiment) and (ii) to stop charging of the battery 16 when the battery temperature is outside the first permissible temperature range (that is, when the battery temperature is lower than 0 degrees Celsius or higher than 60 degrees Celsius). Such charging operation allows to inhibit the deterioration of the battery 16, which in turn serves to extend the life of the battery 16.

The charger 50 is set to maintain the charging voltage (which is applied to each of the first through third battery cells 11-13) at 4.2 volts (that is, 12.6 volts in total for the battery 16) and maintain the charging current at 5 amperes, when the battery temperature is within a first standard temperature range (ranging from 10 degrees Celsius to 45 degrees Celsius in the first embodiment). The numerical values of 4.2 volts and 5 amperes are merely examples, and the magnitudes of the charging voltage and the charging current when the battery temperature is within the first standard temperature range are not limited to these numerical values.

The charger 50 is also set to reduce the charging voltage and the charging current in comparison with the case where the battery temperature is within the first standard temperature range, when the battery temperature is (i) within a first low temperature range (ranging from 0 degrees Celsius to below 10 degrees Celsius in the first embodiment) lower than the first standard temperature range or (ii) within a first high temperature range (ranging from above 45 degrees Celsius to 60 degrees Celsius in the first embodiment) higher than the first standard temperature range.

In one example, the charger 50 is set to (i) maintain the charging voltage at 4.1 volts (that is, 12.3 volts in total for the battery 16) and the charging current at 1.5 amperes within the first low temperature range and (ii) maintain the charging voltage at 4.15 volts (that is, 12.45 volts in total for the battery 16) and the charging current at 3 amperes within the first high temperature range.

The numerical values of 4.1 volts, 4.15 volts, 1.5 amperes, and 3 amperes are merely examples, and the magnitudes of the charging voltage and the charging current when the battery temperature is within the first low temperature range or within the first high temperature range are not limited to these numerical values.

2-1-4. Details of Charging Operation in Charger

The charging process executed in the second control circuit 60 of the charger 50 is described below. The second control circuit 60 executes the charging process when the battery pack 10 is coupled to the charger 50.

Figure 3:
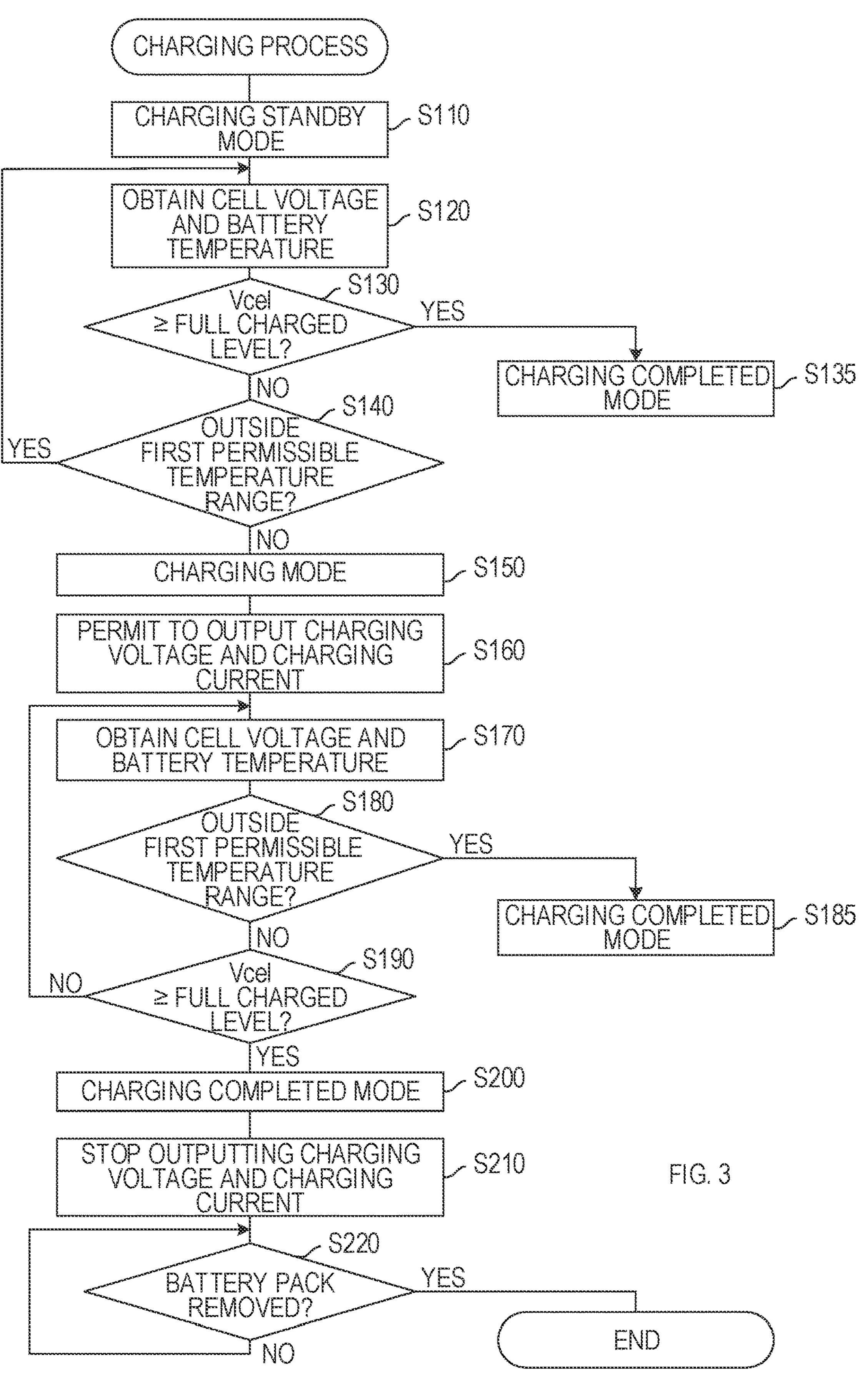
FIG. 3 is a flow chart showing a flow of a charging process.

As shown in FIG. 3, upon start of this charging process, the second control circuit 60 switches the operation modes of the second control circuit 60 to a charging standby mode in S110 and proceeds to S120. In S120, the second control circuit 60 obtains (i) a cell voltage (Vcel) and (ii) the battery temperature based on the signal received from the first voltage detection circuit 56 and the first temperature signal reception circuit 57.

In the first embodiment, the cell voltage corresponds to the respective cell voltages of the first through third battery cells 11-13, any one of the cell voltages of the first through third battery cells 11-13, or an average voltage of the cell voltages of the first through third battery cells 11-13. In other embodiments, the cell voltage may correspond to the battery voltage.

In subsequent S130, the second control circuit 60 determines whether the cell voltage obtained in S120 reaches a full charged level. In the first embodiment, the second control circuit 60 determines whether the cell voltage reaches a predetermined threshold (e.g. a cell voltage at the full charged level).

If the cell voltage reaches the full charged level (S130: YES), the second control circuit 60 proceeds to S135. In S135, the second control circuit 60 switches the operation modes of the second control circuit 60 to a charging completed mode.

When the operation modes of the second control circuit 60 are switched to the charging completed mode, the second control circuit 60 stops the charging process until the battery pack 10 is removed from the charger 50. When a new battery pack is coupled to the charger 50, the second control circuit 60 restarts the charging process from S110.

If the cell voltage does not reach the full charged level (S130: NO), the second control circuit 60 proceeds to S140, and determines whether the battery temperature obtained in S120 is outside the first permissible temperature range (that is, whether the battery temperature is lower than 0 degrees Celsius or higher than 60 degrees Celsius).

If the battery temperature is outside the first permissible temperature range (S140: YES), the second control circuit 60 waits for the battery temperature to fall within the first permissible temperature range while repeatedly executing the processes of S120 through S140.

If the battery temperature is within the first permissible temperature range (S140: NO), the second control circuit 60 proceeds to S150 and switches the operation modes of the second control circuit 60 to a charging mode. Subsequently in S160, the second control circuit 60 permits (or enables) the switched-mode power supply circuit 64 to output the charging voltage and the charging current to thereby initiate charging of the battery 16.

The second control circuit 60 in the charging mode (i) recognizes the battery temperature based on the voltage Vs of the temperature signal received from the first temperature signal reception circuit 57 and (ii) controls the charging voltage and the charging current through the switched-mode power supply circuit 64 in accordance with the charging operation shown in FIG. 2.

Upon initiation of charging of the battery 16, the second control circuit 60 proceeds to S170 and obtains the cell voltage and the battery temperature as described in S120, and then proceeds to S180.

In S180, similarly to S140, the second control circuit 60 determines whether the battery temperature is outside the first permissible temperature range. If the battery temperature is outside the first permissible temperature range (S180: YES), the second control circuit 60 proceeds to S185, and switches the operation modes of the second control circuit 60 to the charging completed mode.

When the operation modes of the second control circuit 60 are switched to the charging completed mode, similarly to S135, the second control circuit 60 stops the charging process until the battery pack 10 is removed from the charger 50. Thus, it is possible to inhibit the deterioration of the battery 16 due to charging of the battery 16 outside the first permissible temperature range.

If the battery temperature is within the first permissible temperature range (S180: NO), the second control circuit 60 proceeds to S190, and determines whether the cell voltage reaches the full charged level as described in S130.

If the cell voltage does not reach the full charged level (S190: NO), the second control circuit 60 repeatedly executes the processes of S170 through S190 until the cell voltage reaches the full charged level.

If the cell voltage reaches the full charged level (S190: YES), the second control circuit 60 proceeds to S200, and switches the operation modes of the second control circuit 60 to the charging completed mode. In this state, the battery 16 is full-charged by the charging voltage and the charging current received from the switched-mode power supply circuit 64. Thus, the second control circuit 60 proceeds to S210 and stops (or disables) the switched-mode power supply circuit 64 from outputting the charging voltage and the charging current.

Subsequently in S220, the second control circuit 60 repeatedly determines whether the battery pack 10 is removed from the charger 50 until the battery pack 10 is removed from the charger 50. When the battery pack 10 is removed from the charger 50 (S220: YES), the second control circuit 60 ends the charging process.

As described above, in the charger 50, the second control circuit 60 (i) recognizes the battery temperature based on the voltage Vs of the temperature signal and (ii) controls the charging voltage and the charging current in accordance with the battery temperature recognized.

2-1-5. Outline of Operation in Battery Pack

Figure 4:
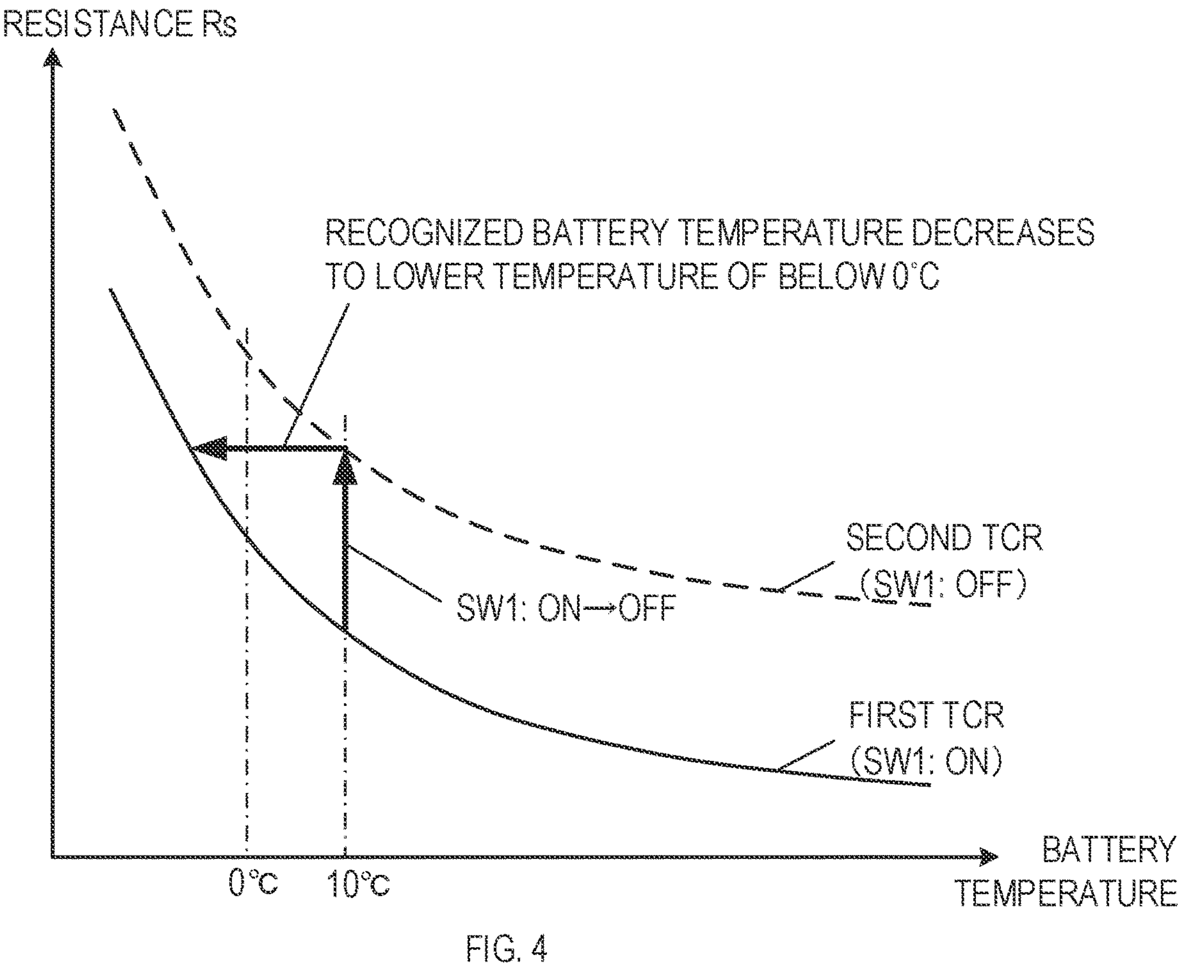
FIG. 4 schematically shows a translation of a temperature coefficient of resistance of a temperature signal generation circuit in the first embodiment.

FIG. 4 shows a Temperature Coefficient of Resistance (TCR) of the temperature signal generation circuit 40 when the first switch SW1 is in the on-state, which is depicted in a solid line. That is, the solid line shows a change in the resistance Rs relative to a change in the battery temperature. The TCR when the first switch SW1 is in the on-state is referred to as "first TCR". The change in the voltage Vs of the temperature signal corresponds to the change in the resistance Rs. The second control circuit 60 recognizes the battery temperature in accordance with the first TCR.

FIG. 4 also shows, in a broken line, a TCR of the temperature signal generation circuit 40 when the first switch SW1 is in the off-state. The TCR when the first switch SW1 is in the off-state is referred to as "second TCR". In response to the first switch SW1 being switched from the on-state to the off-state, the resistance Rs increases by the resistance R1 of the first serial resistor 44. The voltage Vs of the temperature signal increases in accordance with the increase in the resistance Rs. In other words, the TCR of the temperature signal generation circuit 40 is translated from the first TCR to the second TCR.

The first serial resistor 44 has the resistance R1 that increases the resistance Rs (and the voltage Vs of the temperature signal) so that the charger 50 recognizes the battery temperature lower than a lower limit (which is 0 degrees Celsius in the first embodiment) of the first permissible temperature range when (i) the actual battery temperature is within the first low temperature range and (ii) the first switch SW1 is in the off-state.

Figure 5:
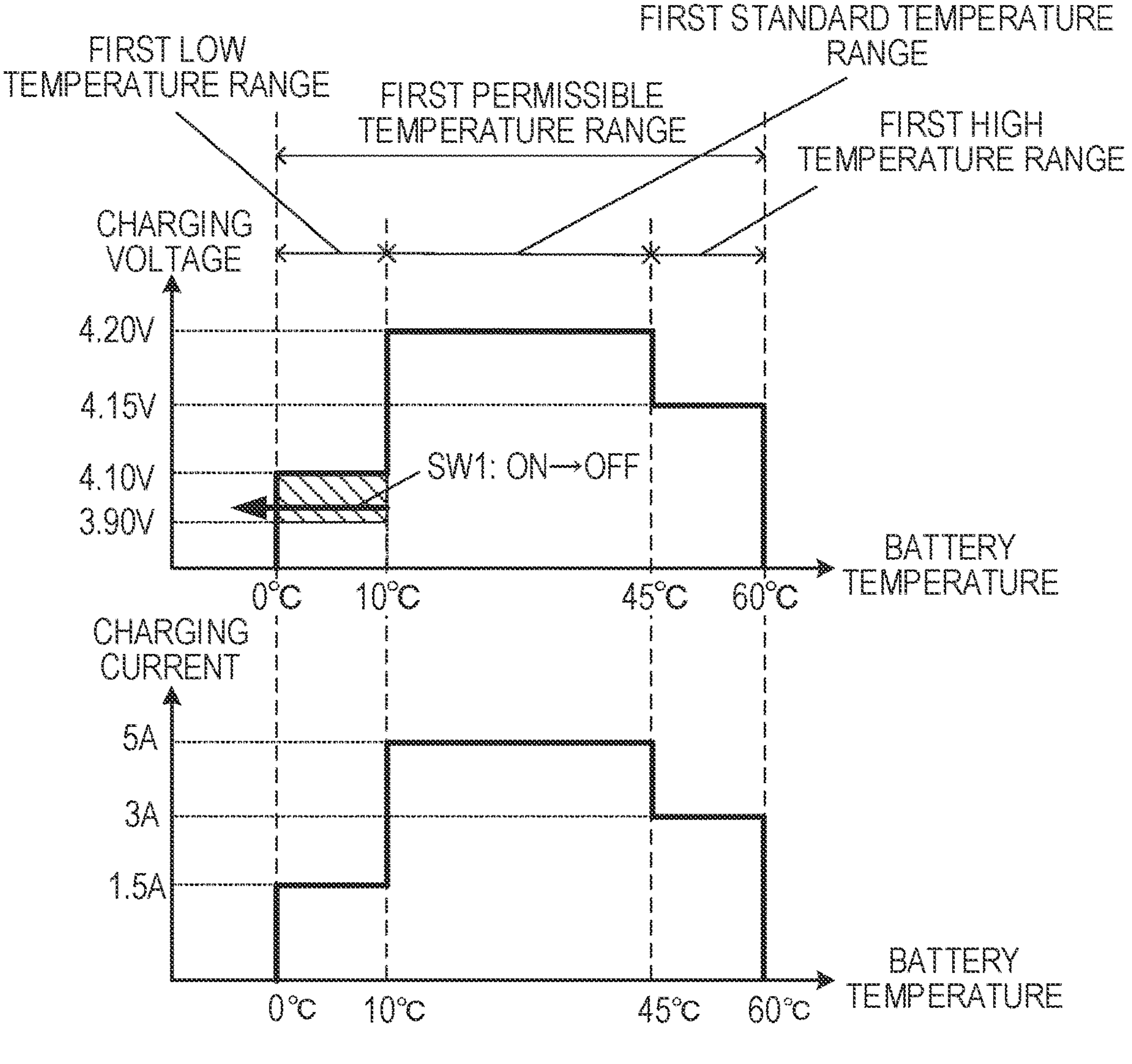
FIG. 5 schematically shows an adjustment to the charging operation in the first embodiment.

As shown in FIG. 5, the first control circuit 30 of the battery pack 10 turns off the first switch SW1 when a first charging stopping requirement is satisfied. The first charging stopping requirement is satisfied when (i) the battery temperature detected by the temperature detection circuit 34 is lower than 10 degrees Celsius and (ii) the cell voltage detected by the cell voltage detection circuit 32 is higher than 3.9 volts. The numerical values of 10 degrees Celsius and 3.9 volts in the first charging stopping requirement are merely examples, and the battery temperature and the cell voltage in the first charging stopping requirement are not limited to these numerical values. The numerical values can be determined in accordance with the characteristics of the battery 16. The first charging stopping requirement in other embodiments may include only one of either the battery temperature or the cell voltage.

The first control circuit 30 turns on the first switch SW1 when the first charging stopping requirement is not satisfied (i.e. when (i) the battery temperature detected by the temperature detection circuit 34 is higher than or equal to 10 degrees Celsius or (ii) the cell voltage detected by the cell voltage detection circuit 32 is lower than or equal to 3.9 volts).

Thus, in the first embodiment, the charger 50 recognizes the battery temperature of below 0 degrees Celsius and stop charging of the battery 16 when the battery temperature detected by the temperature detection circuit 34 is lower than 10 degrees Celsius (i.e. when the battery temperature is within the first low temperature range) and the cell voltage detected by the cell voltage detection circuit 32 is higher than 3.9 volts (e.g. when the cell voltage is higher than 3.9 volts and lower than or equal to 4.1 volts). In other words, the battery pack 10 forcibly stops the charging operation of the charger 50 with the temperature signal.

2-1-6. Details of Operation in Battery Pack

The first biasing process executed in the first control circuit 30 is described below. The first control circuit 30 executes the first biasing process when the battery pack 10 is coupled to the external device.

Figure 6:
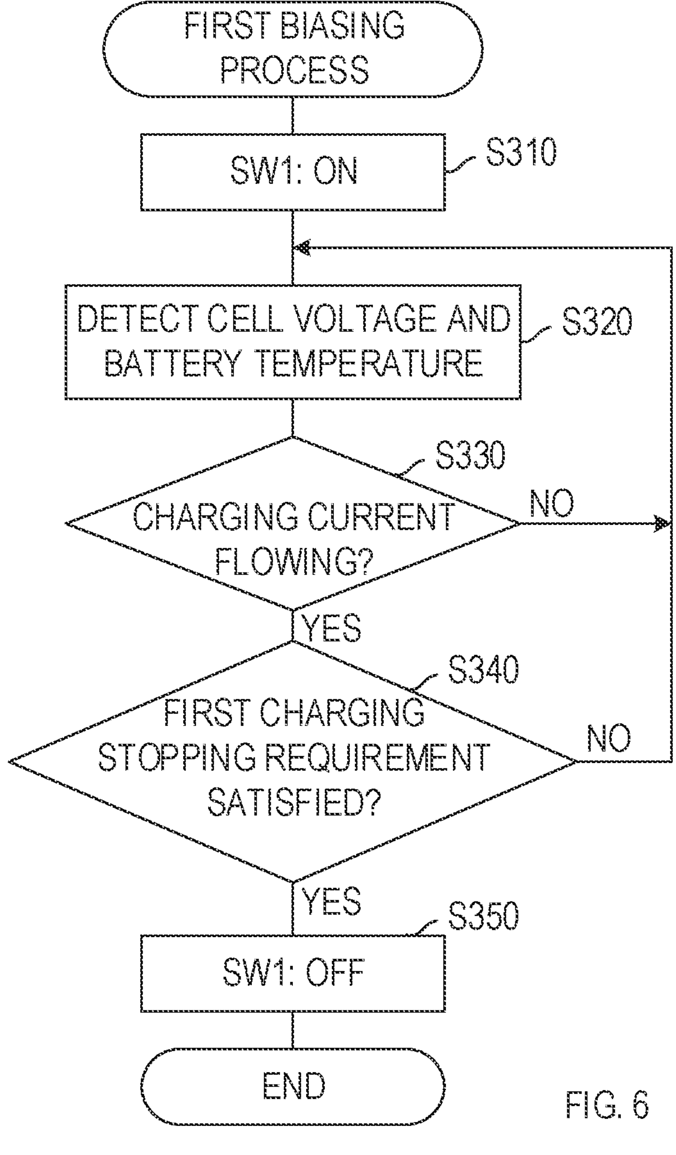
FIG. 6 is a flow chart showing a flow of a first biasing process.

As shown in FIG. 6, upon start of the first biasing process, the first control circuit 30 turns on the first switch SW1 in S310. Subsequently in S320, the first control circuit 30 detects the cell voltage and the battery temperature through the cell voltage detection circuit 32 and the temperature detection circuit 34. Subsequently in S330, based on the voltage of the current detection signal received from the current detection circuit 36, the first control circuit 30 determines whether the charging current is flowing from the external device (the charger 50 in the first embodiment) to the battery pack 10.

If the charging current is not flowing (i.e. the battery 16 is not being charged) (S330: NO), the first control circuit 30 returns to S320 and waits for the charging current to flow (i.e. the first control circuit 30 waits for charging of the battery 16 to be started) while repeatedly executing the processes of S320 and S330.

If the charging current is flowing (S330: YES), the first control circuit 30 proceeds to S340 and determines whether the first charging stopping requirement is satisfied (i.e. whether (i) the battery temperature detected in S320 is lower than 10 degrees Celsius and (ii) the cell voltage detected in S320 is higher than 3.9 volts).

If the first charging stopping requirement is not satisfied (i.e. when (i) the battery temperature is higher than or equal to 10 degrees Celsius, or (ii) the cell voltage is lower than or equal to 3.9 volts) (S340: NO), the first control circuit 30 returns to S320 and executes the processes of S320 and thereafter again.

If the first charging stopping requirement is satisfied (S340: YES), the first control circuit 30 proceeds to S350 and turns off the first switch SW1. Upon completion of the process of S350, the first control circuit 30 ends the first biasing process.

2-1-7. Effects in First Embodiment

As discussed above, in the battery pack 10 of the first embodiment, the first switch SW1 is turned off and the resistance Rs of the temperature signal generation circuit 40 increases, when the first charging stopping requirement is satisfied.

In response to the resistance Rs of the temperature signal generation circuit 40 increasing (i.e., in response to the TCR of the temperature signal generation circuit 40 being translated from the first TCR to the second TCR), the charger 50 recognizes the battery temperature decreased to a lower temperature of below 0 degrees Celsius as shown in FIGS. 4 and 5, and stops its charging operation.

Thus, the battery pack 10 can forcibly stop the charging operation of the charger 50 when the first charging stopping requirement is satisfied.

In other words, the battery pack 10 can adjust the charging operation of the charger 50 in accordance with the characteristics of the battery 16, and thus effectively inhibit the deterioration of the battery 16.

2-1-8. Correspondence Between Terms

In the first embodiment, the first signal output terminal 25 corresponds to one example of the first signal terminal in the overview of embodiments, and the second power supply terminal 22 corresponds to one example of the second power supply terminal in the overview of embodiments and also one example of the second signal terminal in the overview of embodiments. The first signal input terminal 55 corresponds to one example of the first corresponding terminal in the overview of embodiments, and the first negative electrode terminal 52 corresponds to one example of the second corresponding terminal in the overview of embodiments and also one example of the negative electrode terminal in the overview of embodiments. The first terminal 40A and the second terminal 40B correspond to one example of the pair of terminals in the overview of embodiments, the second supply voltage Vdd corresponds to one example of the input voltage in the overview of embodiments, the first pull-up resistor 58 corresponds to one example of the voltage dividing resistor in the overview of embodiments, and the first serial resistor 44 corresponds to one example of the first resistor in the overview of embodiments. The first low temperature range corresponds to one example of the first temperature range in the overview of embodiments, and the cell voltage detection circuit 32 corresponds to one example of the voltage detection circuit in the overview of embodiments.

2-1-9. First Variation 2-1-9-1. Outline of Operation in Battery Pack

Figure 7:
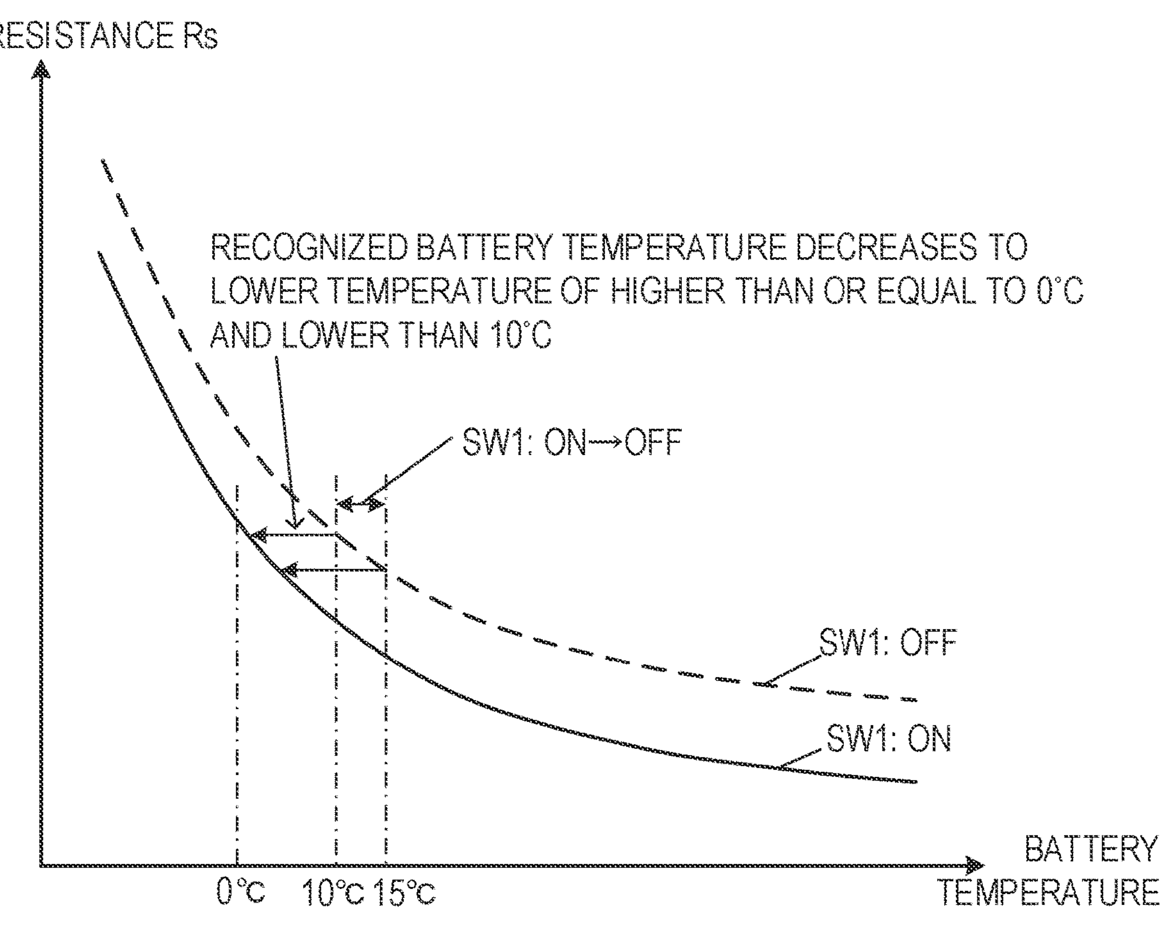
FIG. 7 schematically shows a translation of a temperature coefficient of resistance of a temperature signal generation circuit in a first variation.

As shown in FIG. 7, in the first variation, the first control circuit 30 turns off the first switch SW1 to thereby lower the battery temperature recognized by the charger 50 into the first low temperature range, when a first charging rate reduction requirement is satisfied. The first charging rate reduction requirement is satisfied when the battery temperature detected by the temperature detection circuit 34 is higher than or equal to 10 degrees Celsius and lower than 15 degrees Celsius. The numerical range ranging from 10 degrees Celsius to below 15 degrees Celsius in the first charging rate reduction requirement is merely an example, and the numerical range in the first charging rate reduction requirement is not limited to this range, and can be determined in accordance with the characteristics of the battery 16.

Figure 8:
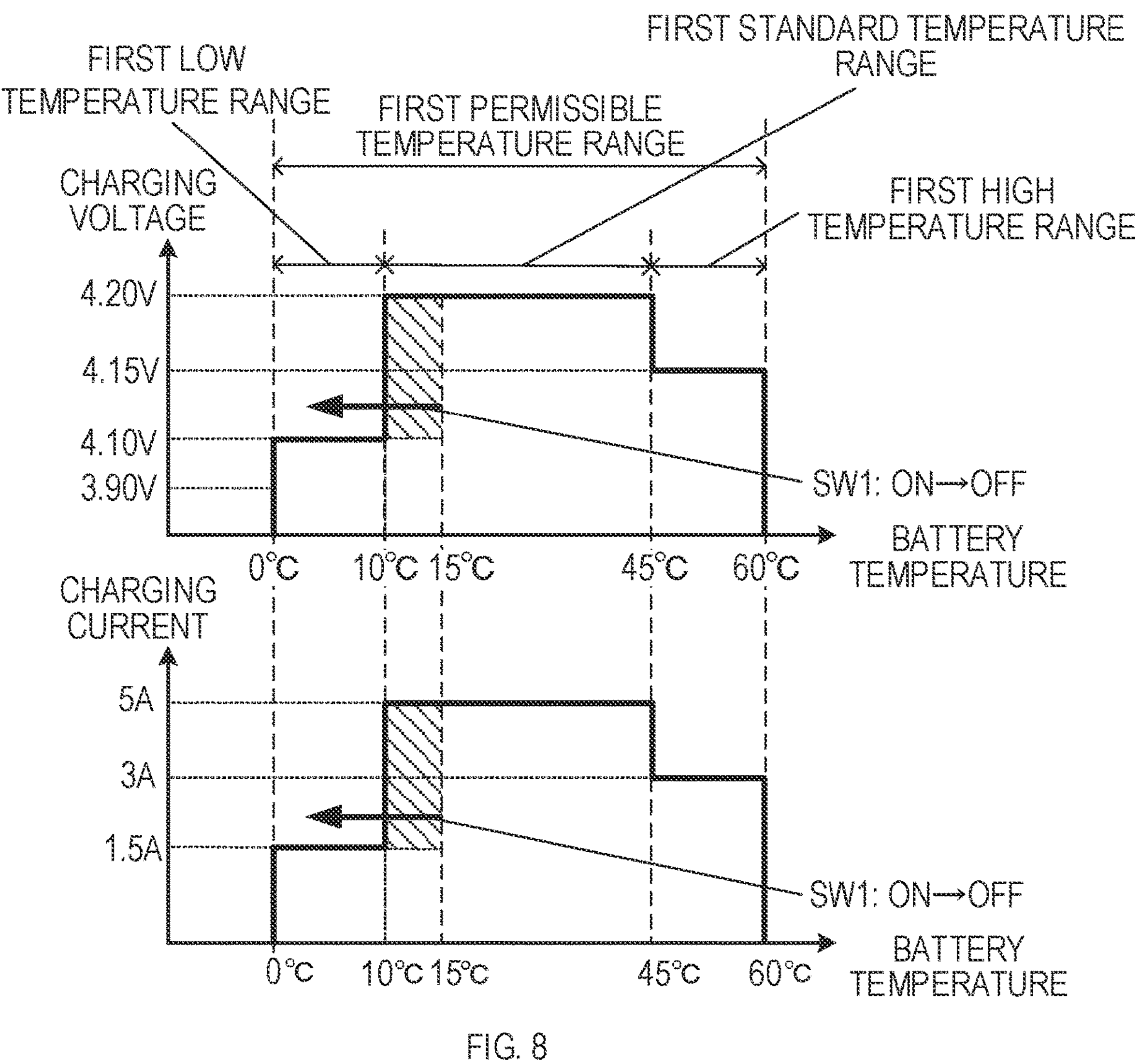
FIG. 8 schematically shows an adjustment to a charging operation in the first variation.

As shown in FIG. 8, the charger 50 (more specifically, the second control circuit 60) is set to reduce the charging voltage and the charging current to be supplied to the battery pack 10 to be lower than those in the first standard temperature range when the charger 50 (more specifically, the second control circuit 60) recognizes that the battery temperature is within the first low temperature range.

Thus, the battery pack 10 in the first variation can make the charger 50 reduce the charging voltage and the charging current to perform a slow charging even when the actual battery temperature is within the first standard temperature range.

In other words, the battery pack 10 in the first variation can also adjust the charging operation of the charger 50 in accordance with the characteristics of the battery 16, and can exhibit the effects similar to those in the first embodiment.

2-1-9-2. Details of Operation in Battery Pack

Figure 9:
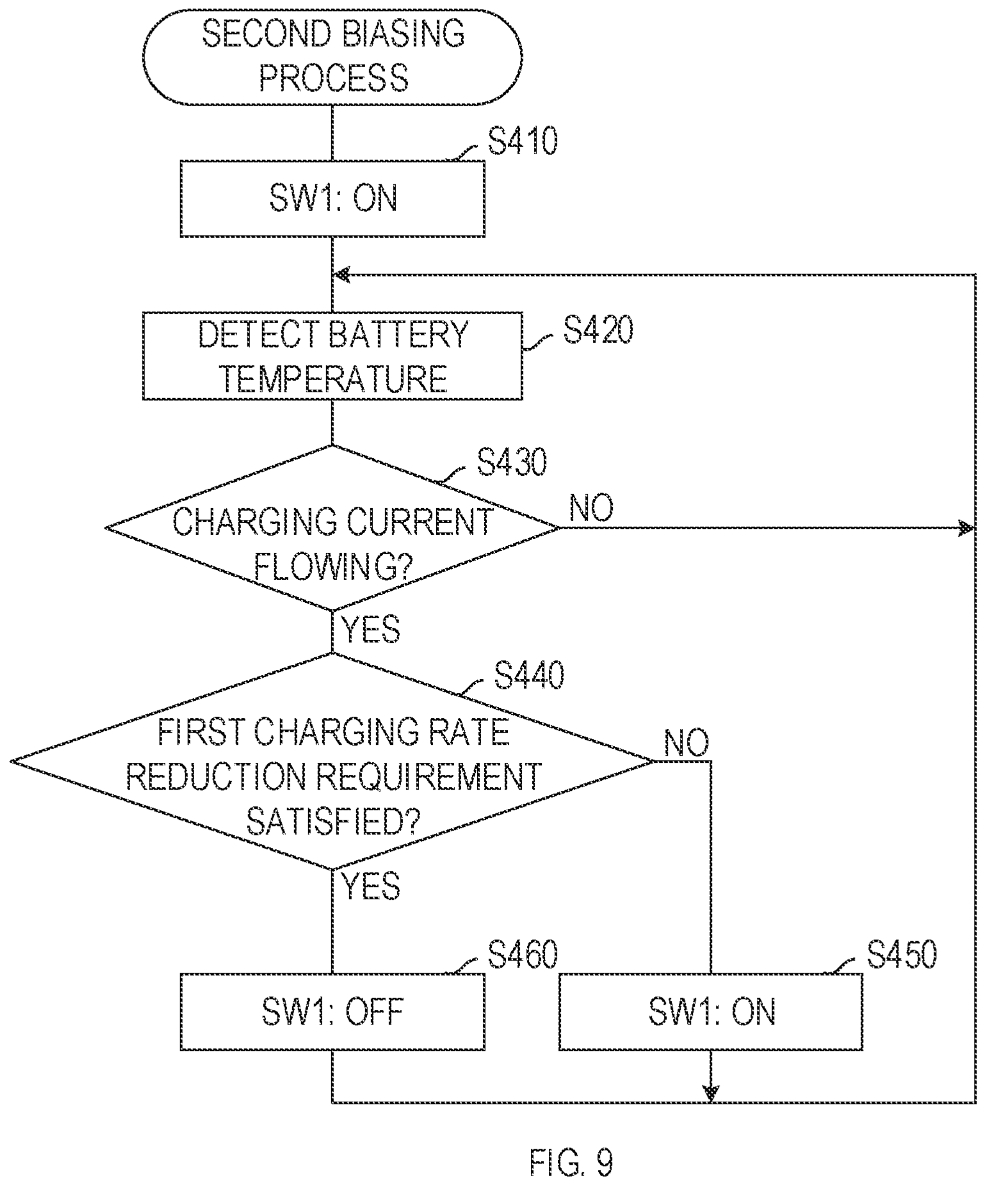
FIG. 9 is a flow chart showing a flow of a second biasing process.

The first control circuit 30 in the first variation executes a second biasing process shown in FIG. 9 in place of or in addition to the first biasing process.

As shown in FIG. 9, the first control circuit 30 turns on the first switch SW1 in S410. Subsequently in S420, the first control circuit 30 detects the battery temperature through the temperature detection circuit 34.

Then in S430, similarly to S330, the first control circuit 30 determines whether the charging current is flowing from the external device (i.e. the charger 50) to the battery pack 10 based on the voltage of the current detection signal received from the current detection circuit 36.

If the charging current is not flowing (S430: NO), the first control circuit 30 returns to S420 and waits for the charging current to flow while repeatedly executing the processes of S420 and S430.

If the charging current is flowing (S430: YES), the first control circuit 30 proceeds to S440 and determines whether the first charging rate reduction requirement is satisfied (i.e., the first control circuit 30 determines whether the battery temperature detected in S420 is higher than or equal to 10 degrees Celsius and lower than 15 degrees Celsius).

If the first charging rate reduction requirement is not satisfied (i.e. if the battery temperature is lower than 10 degrees Celsius, or higher than or equal to 15 degrees Celsius) (S440: NO), the first control circuit 30 proceeds to S450 and turns on the first switch SW1. Upon completion of the process of S450, the first control circuit 30 returns to S420.

If the first charging rate reduction requirement is satisfied (S440: YES), the first control circuit 30 proceeds to S460 and turns off the first switch SW1. Upon completion of the process of S460, the first control circuit 30 returns to S420.

2-1-9-3. Correspondence Between Terms

In the first variation, in the case where the first control circuit 30 executes the second biasing process in place of the first biasing process, the range of the battery temperature ranging from 10 degrees Celsius to below 15 degrees Celsius corresponds to one example of the first temperature range in the overview of embodiments. In the case where the first control circuit 30 executes the second biasing process in addition to the first biasing process, the range of the battery temperature ranging from 10 degrees Celsius to below 15 degrees Celsius corresponds to one example of the second temperature range in the overview of embodiments.

2-2. Second Embodiment

The battery pack 10 in the second embodiment corresponds to the battery pack 10 in the first embodiment but is partially modified. More specifically, the battery pack 10 in the second embodiment is different from the battery pack 10 in the first embodiment in terms of the configuration of the temperature signal generation circuit 40 and the process executed by the first control circuit 30. Thus, the following discussion focuses only on the configuration of the temperature signal generation circuit 40 and the process executed by the first control circuit 30.

2-2-1. Circuit Configuration of Battery Pack

Figure 10:
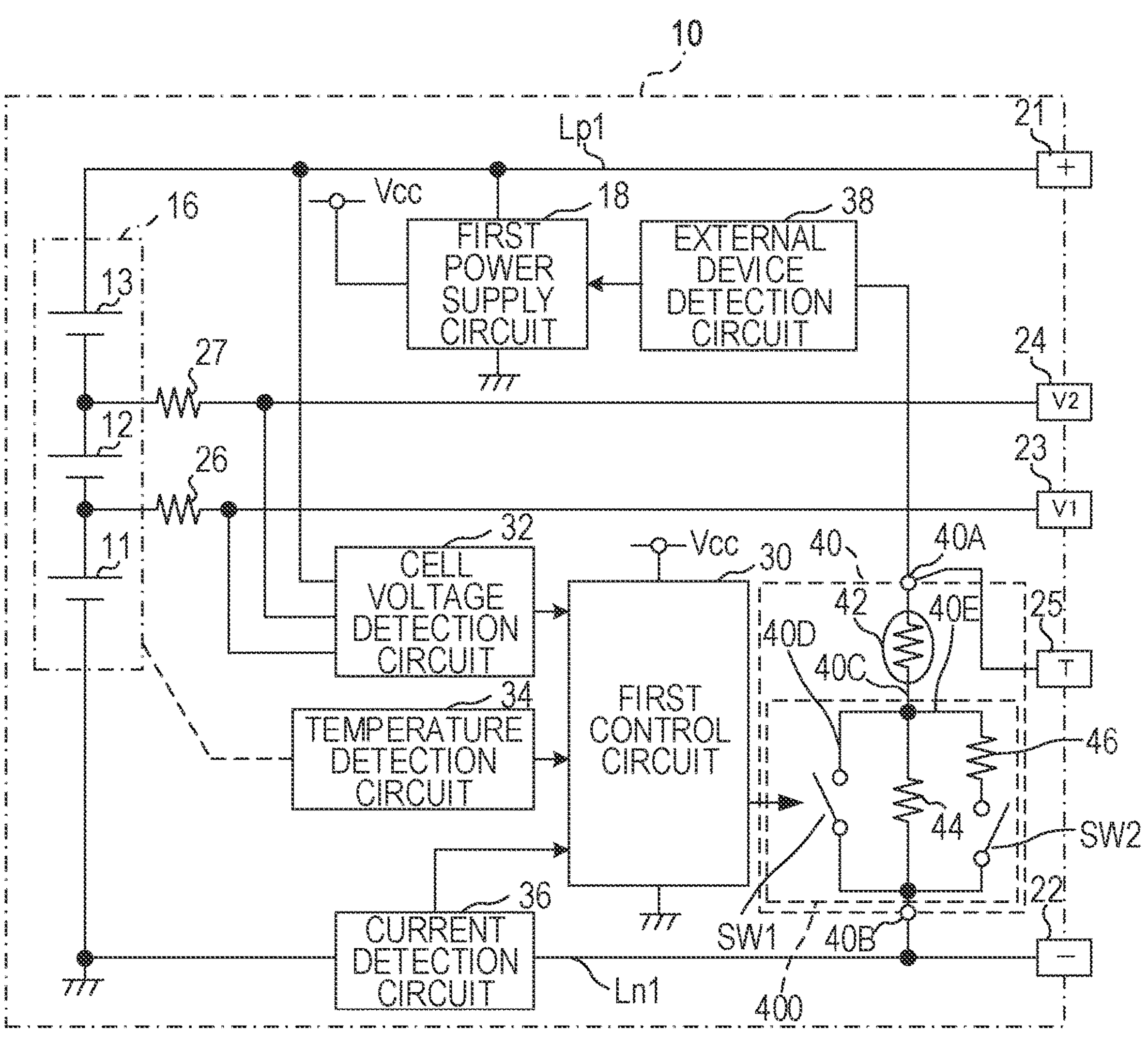
FIG. 10 is a block diagram showing a circuit configuration of a battery pack in a second embodiment.

As shown in FIG. 10, in the second embodiment, the inserted resistor 43 is removed from the temperature signal generation circuit 40 of the first embodiment. In addition, the temperature signal generation circuit 40 of the second embodiment includes the biasing circuit 400 partially modified.

The biasing circuit 400 of the second embodiment additionally includes a third current path 40E coupled in parallel with the first serial resistor 44, a first current-dividing resistor 46 on the third current path 40E, and a second switch SW2 coupled in series with the first current-dividing resistor 46 on the third current path 40E. The second switch SW2 is configured to be switched between an on-state and an off-state. The second switch SW2 in the second embodiment is an FET. In other embodiments, the second switch SW2 may be a semiconductor switch in any other form, including a bipolar transistor, an IGBT, and an SSR, or a mechanical relay.

When the both of the first switch SW1 and the second switch SW2 are in their respective off-states, both of the second and third current paths 40D and 40E are interrupted. In this state, the resistance Rs of the temperature signal generation circuit 40 is equivalent to or approximate to the sum of (i) the resistance Rm of the temperature detection device 42 and (ii) the resistance R1 of the first serial resistor 44 (that is, Rs=Rm+R1, or Rs≈Rm+R1).

When (i) the first switch SW1 is in the on-state and (ii) the second switch SW2 is in the off-state, the second current path 40D is completed, and the third current path 40E is interrupted. In other words, the both ends of the first serial resistor 44 are short-circuited. In this state, the resistance Rs of the temperature signal generation circuit 40 is equivalent to or approximate to the resistance Rm of the temperature detection device 42 (that is, Rs=Rm, or Rs Rm). Thus, the resistance Rs in this state is smaller than the resistance Rs when both of the first switch SW1 and the second switch SW2 are in their respective off-states.

When (i) the first switch SW1 is in the off-state and (ii) the second switch SW2 is in the on-state, the second current path 40D is interrupted, and the third current path 40E is completed. In this state, the resistance Rs of the temperature signal generation circuit 40 is equivalent to or approximate to the combined resistance of (i) the resistance Rm of the temperature detection device 42, (ii) the resistance R1 of the first serial resistor 44, and (iii) the resistance R2 of the first current-dividing resistor 46 (that is, $Rs=Rm+(R1\cdot R2/(R1+R2))$, or $Rs\approx Rm+(R1\cdot R2/(R1+R2))$).

Thus, the resistance Rs in this state is (i) smaller than the resistance Rs when both of the first switch SW1 and the second switch SW2 are in their respective off-states and (ii) larger than the resistance Rs when the first switch SW1 is in the on-state and the second switch SW2 is in the off-state.

Figure 11:
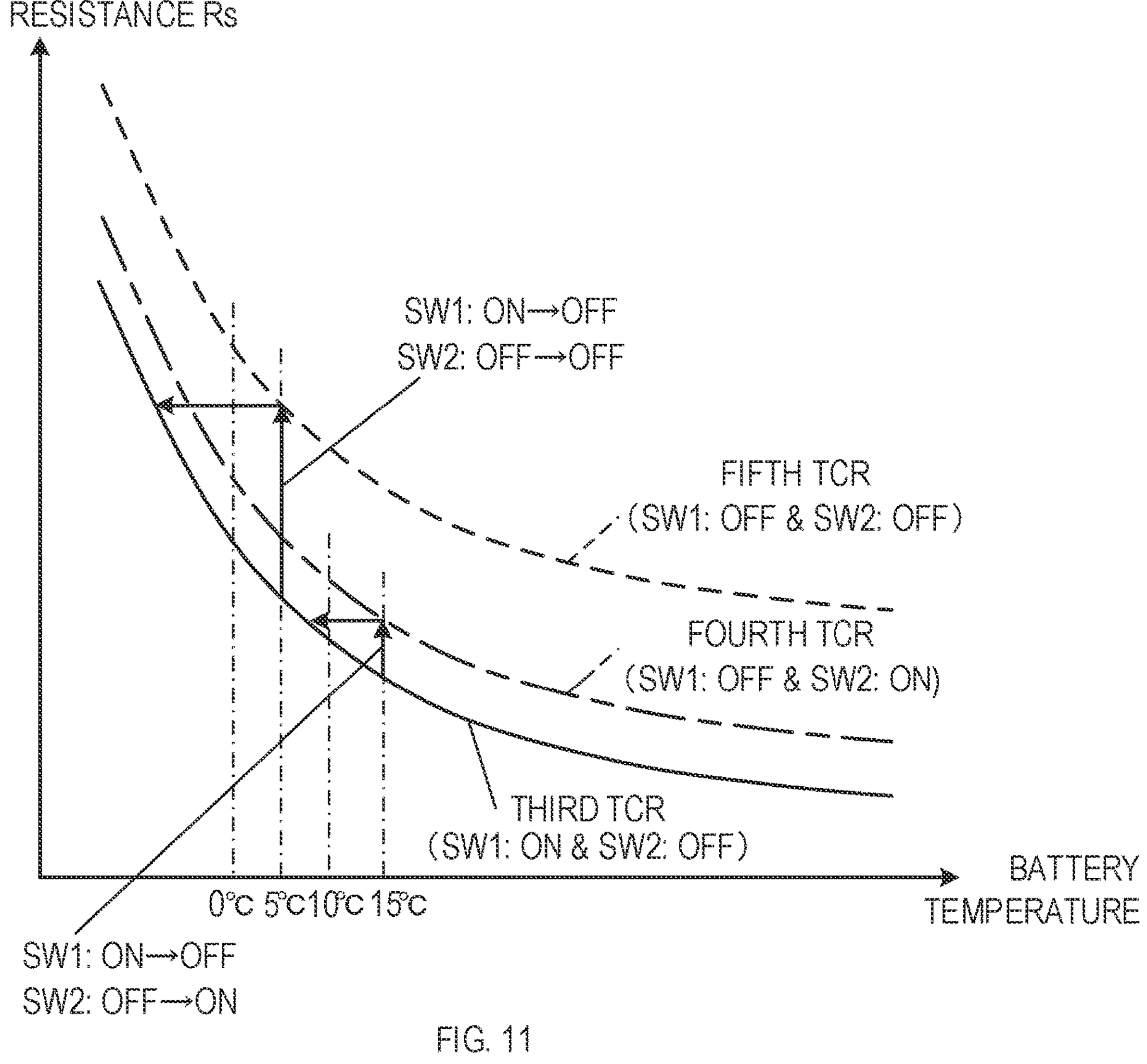
FIG. 11 schematically shows a translation of a temperature coefficient of resistance of a temperature signal generation circuit in the second embodiment.

The TCR of the temperature signal generation circuit 40 in the second embodiment is translated as shown in FIG. 11.

As shown in a solid line in FIG. 11, when the first switch SW1 is in the on-state, the TCR of the temperature signal generation circuit 40 is the lowest regardless of whether the second switch SW1 is in the on-state or the off-state (hereinafter, this lowest TCR is referred to as "third TCR").

As shown in a dash-dotted line in FIG. 11, the TCR of the temperature signal generation circuit 40 is larger than the third TCR when (i) the first switch SW1 is in the off-state and (ii) the second switch SW2 is in the on-state (hereinafter, this second lowest TCR is referred to as "fourth TCR").

As shown in a broken line in FIG. 11, the TCR of the temperature signal generation circuit 40 is the highest when both of the first switch SW1 and the second switch SW2 are in their off-states (hereinafter, this highest TCR is referred to as "fifth TCR")

The charger 50 recognizes the battery temperature in accordance with the third TCR depicted in the solid line in FIG. 11. Thus, the battery temperature recognized by the charger 50 decreases when the first switch SW1 is solely turned off.

When the second switch SW2 is also turned off in addition to the first switch SW1, the battery temperature recognized by the charger 50 decreases further.

2-2-2. Outline of Operations in Charger and Battery Pack

Figure 12:
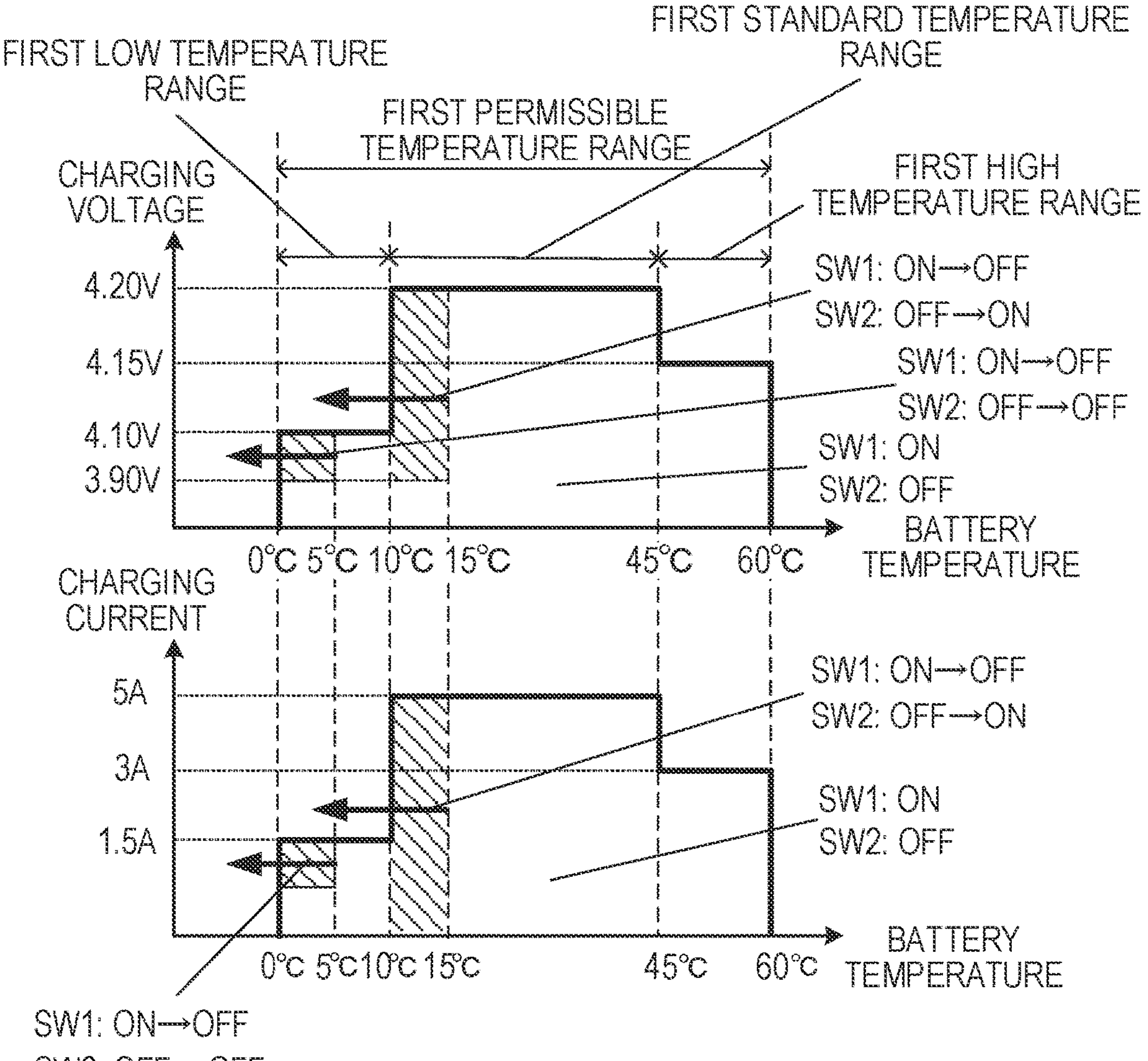
FIG. 12 schematically shows an adjustment to a charging operation in the second embodiment.

As shown in FIG. 12, the charger 50 of the second embodiment is set to perform a charging operation similar to that of the first embodiment.

In the basic operation, the first control circuit 30 of the battery pack 10 in the second embodiment maintains the first switch SW1 in the on-state and the second switch SW2 in the off-state (that is, the TCR of the temperature signal generation circuit 40 is maintained at the third TCR) when the battery temperature detected by the temperature detection circuit 34 is within the first permissible temperature range (ranging from 0 degrees Celsius to 60 degrees Celsius).

The first control circuit 30 turns off the first switch SW1 and turns on the second switch SW2 when a second charging rate reduction requirement is satisfied. The second charging rate reduction requirement is satisfied when (i) the battery temperature detected by the temperature detection circuit 34 is higher than or equal to 10 degrees Celsius and lower than 15 degrees Celsius and (ii) the cell voltage detected by the cell voltage detection circuit 32 is higher than 3.9 volts.

As a result, the TCR of the temperature signal generation circuit 40 is translated to the fourth TCR, and the charger 50 recognizes the actual battery temperature of higher than or equal to 10 degrees Celsius and lower than 15 degrees Celsius as the battery temperature within the first low temperature range (ranging from 0 degrees Celsius to below 10 degrees Celsius). Thus, the charger 50 reduces the charging voltage and the charging current.

The numerical range ranging from 10 degrees Celsius to below 15 degrees Celsius, and the numerical range of higher than 3.9 volts in the second charging rate reduction requirement are merely examples, and the numerical ranges in the second charging rate reduction requirement are not limited to these ranges, and can be determined in accordance with the characteristics of the battery 16.

Even when the battery temperature is within the first standard temperature range, the battery pack 10 of the second embodiment makes the charger 50 reduce the charging voltage and the charging current so that a slow charging is performed, if (i) the battery temperature detected by the temperature detection circuit 34 is lower than 15 degrees Celsius and (ii) the cell voltage detected by the cell voltage detection circuit 32 exceeds 3.9 volts.

The first control circuit 30 turns off both of the first switch SW1 and the second switch SW2 when a second charging stopping requirement is satisfied. The second charging stopping requirement is satisfied when (i) the battery temperature is higher than or equal to 0 degrees Celsius and lower than 5 degrees Celsius and (ii) the cell voltage detected by the cell voltage detection circuit 32 exceeds 3.9 volts. As a result, the TCR of the temperature signal generation circuit 40 is translated to the fifth TCR.

This fifth TCR is set so that the charger 50 recognizes the actual battery temperature of higher than or equal to 0 degrees Celsius and lower than 5 degrees Celsius as the battery temperature of lower than 0 degrees Celsius. Thus, when (i) the battery temperature is higher than or equal to 0 degrees Celsius and lower than 5 degrees Celsius and (ii) the cell voltage exceeds 3.9 volts, the charger 50 stops charging of the battery 16.

Therefore, the battery pack 10 of the second embodiment makes the charger 50 stop charging of the battery 16 when the actual battery temperature falls below 5 degrees Celsius in the first low temperature range.

In other words, the battery pack 10 of the second embodiment can also exhibit the effects similar to those exhibited by the battery packs 10 of the first embodiment and the first variation.

The numerical range ranging from 0 degrees Celsius to below 5 degrees Celsius, and the numerical range of higher than 3.9 volts in the second charging stopping requirement are merely examples, and the numerical ranges in the second charging stopping requirement are not limited to these ranges, and can be determined in accordance with the characteristics of the battery 16.

2-2-3. Details of Operation in Battery Pack

Figure 13:
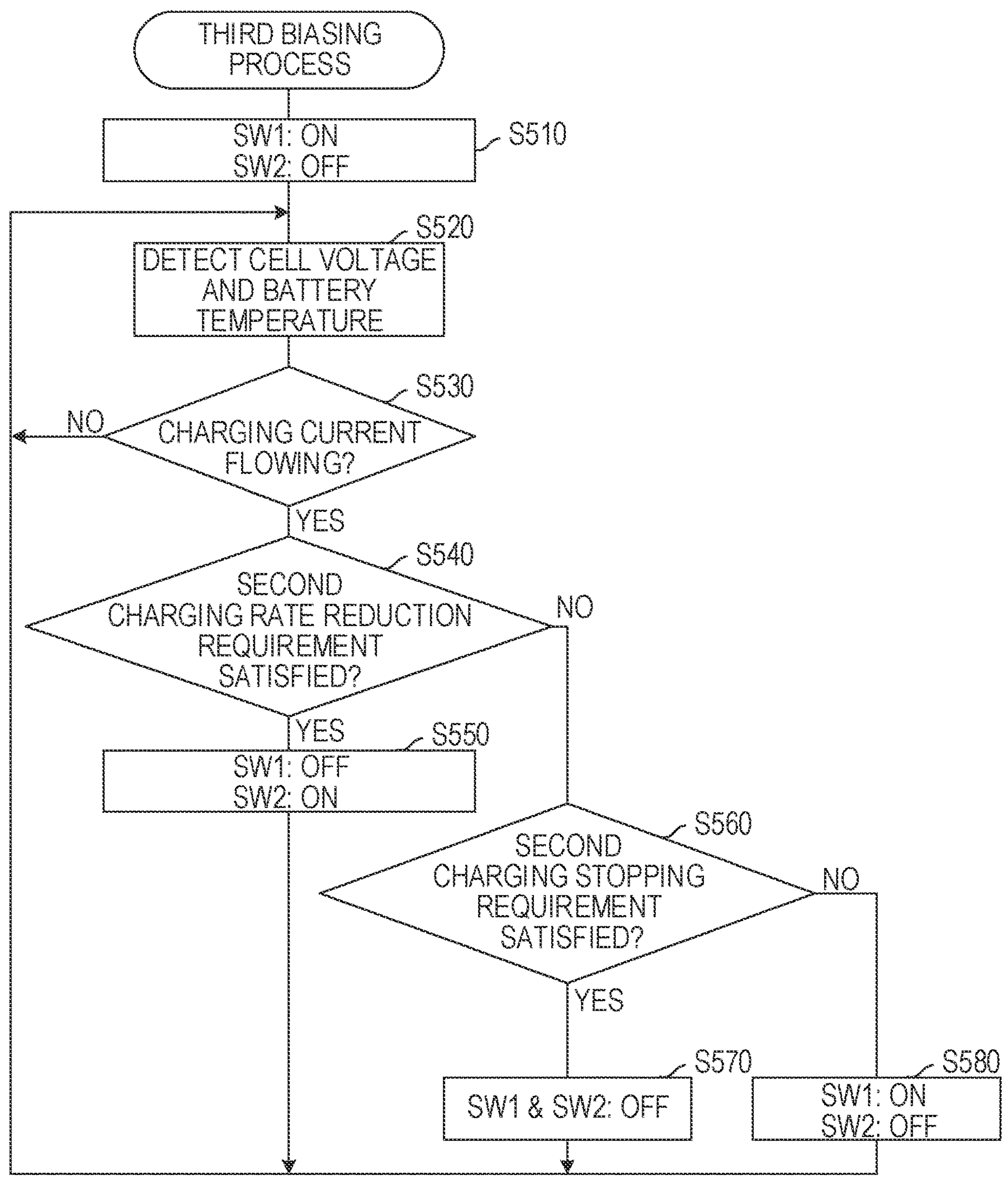
FIG. 13 is a flow chart showing a flow of a third biasing process.

The first control circuit 30 in the second embodiment executes a third biasing process shown in FIG. 13 in place of the first biasing process.

As shown in FIG. 13, in S510, the first control circuit 30 (*i*) turns on the first switch SW1 and (ii) turns off the second switch SW2. Subsequently in S520, the first control circuit 30 (*i*) detects the cell voltage through the cell voltage detection circuit 32 and (ii) detects the battery temperature through temperature detection circuit 34. Then in S530, the first control circuit 30 determines whether the charging current is flowing from the external device (i.e. the charger 50) to the battery pack 10 based on the voltage of the current detection signal received from the current detection circuit 36.

If the charging current is not flowing (S530: NO), the first control circuit 30 returns to S520, and waits for the charging current to flow while repeatedly executing the processes of S520 and S530.

If the charging current is flowing (S530: YES), the first control circuit 30 proceeds to S540 and determines whether the second charging rate reduction requirement is satisfied.

If the second charging rate reduction requirement is satisfied (that is, when (i) the battery temperature is higher than or equal to 10 degrees Celsius and lower than 15 degrees Celsius and (ii) the cell voltage is higher than 3.9 volts) (S540: YES), the first control circuit 30 proceeds to S550 and (i) turns off the first switch SW1 and (ii) turns on the second switch SW2. In S550, in order to avoid both of the first switch SW1 and the second switch SW2 to be in the respective off-states simultaneously, the first control circuit 30 firstly turns on the second switch SW2 and then turns off the first switch SW1. Upon completion of the process of S550, the first control circuit 30 returns to S520.

If the second charging rate reduction requirement is not satisfied (that is, when (i) the battery temperature is lower than 10 degrees Celsius or higher than or equal to 15 degrees Celsius, or (ii) the cell voltage is lower than or equal to 3.9 volts) (S540: NO), the first control circuit 30 proceeds to S560.

In S560, the first control circuit 30 determines whether the second charging stopping requirement is satisfied. If the second charging stopping requirement is satisfied (that is, when (i) the battery temperature is higher than or equal to 0 degrees Celsius and lower than 5 degrees Celsius, and (ii) the cell voltage exceeds 3.9 volts) (S560: YES), the first control circuit 30 proceeds to S570 and turns off both of the first switch SW1 and the second switch SW2. Upon completion of the process of S570, the first control circuit 30 returns to S520.

If the second charging stopping requirement is not satisfied (that is, when (i) the battery temperature is lower than 0 degrees Celsius or higher than or equal to 5 degrees Celsius, or (ii) the cell voltage is lower than or equal to 3.9 volts) (S560: NO), the first control circuit 30 proceed to S580. In S580, the first control circuit 30 (*i*) turns on the first switch SW1 and (ii) turns off the second switch SW2 and then returns to S520. In S580, in order to avoid both of the first switch SW1 and the second switch SW2 to be in the respective off-states simultaneously, the first control circuit 30 firstly turns on the first switch SW1 and then turns off the second switch SW2.

2-2-4. Correspondence Between Terms

In the second embodiment, the first current-dividing resistor 46 corresponds to one example of the second resistor in the overview of embodiments. The range of the battery temperature ranging from 15 degrees Celsius to 60 degrees Celsius corresponds to one example of the third temperature range in the overview of embodiments. The range of the battery temperature ranging from 10 degrees Celsius to below 15 degrees Celsius corresponds to one example of the fourth temperature range in the overview of embodiments. The range of the battery temperature ranging from 0 degrees Celsius to below 5 degrees Celsius corresponds to one example of the fifth temperature range in the overview of embodiments.

2-2-5. Second Variation

The second variation provides the second embodiment partially modified. More specifically, the second variation provides a fourth biasing process corresponding to the third biasing process partially modified. The first control circuit 30 in the second variation executes the fourth biasing process in place of the third biasing process.

Figure 14:
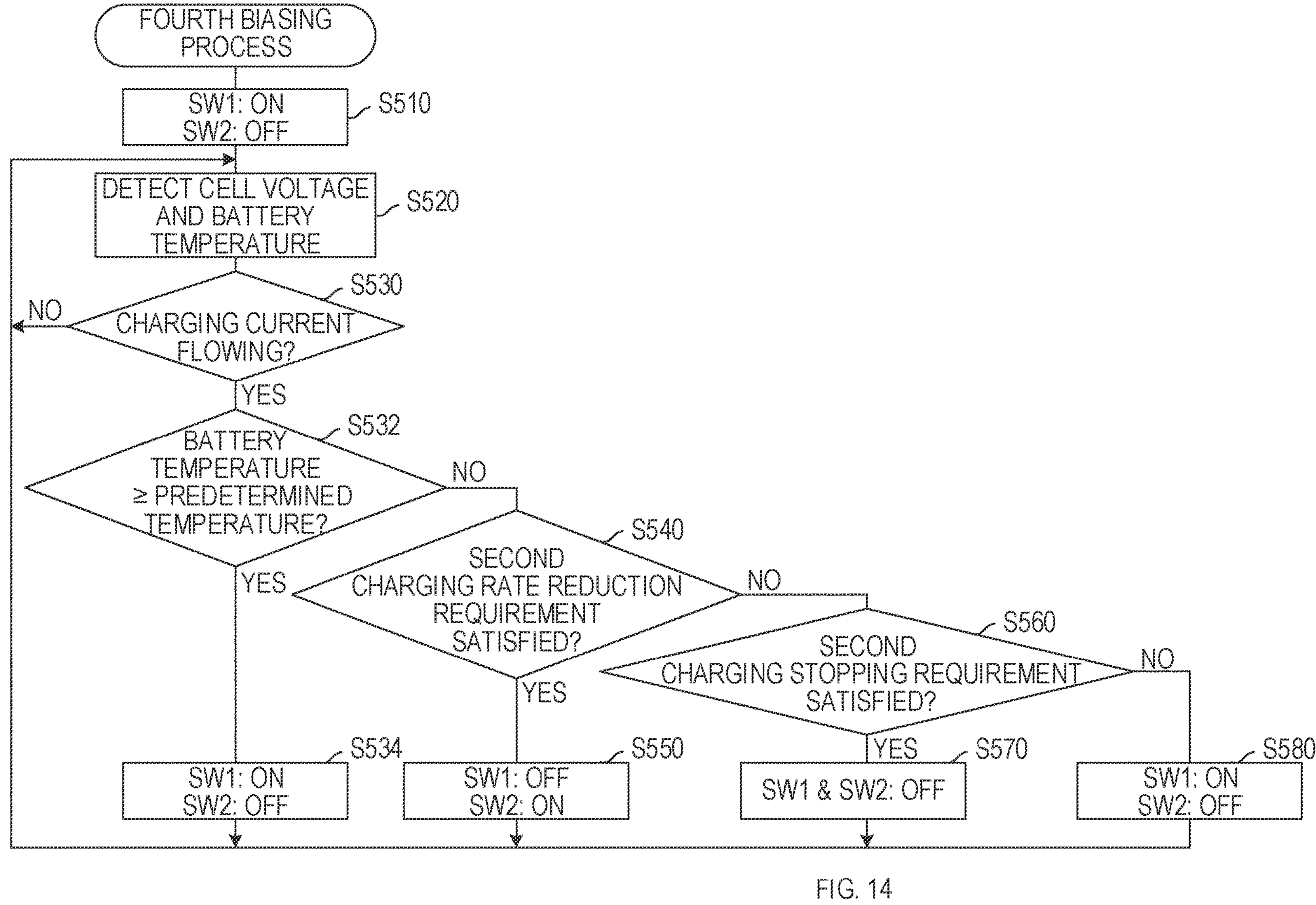
FIG. 14 is a flow chart showing a flow of a fourth biasing process.

As shown in FIG. 14, in the fourth biasing process, if the charging current is flowing in S530 (S530: YES), the first control circuit 30 proceeds not to S540 but to S532. In S532, the first control circuit 30 determines whether the battery temperature detected in S520 is higher than or equal to a predetermined temperature (which is 15 degrees Celsius in the second variation). The predetermined temperature is not limited to 15 degrees Celsius, and can be determined in accordance with the characteristics of the battery 16.

If the battery temperature is higher than or equal to the predetermined temperature (S532: YES), the first control circuit 30 proceeds to S534 and (i) turns on the first switch SW1 and (ii) turns off the second switch SW2. In S534, in order to avoid both of the first switch SW1 and the second switch SW2 to be in the respective off-states simultaneously, the first control circuit 30 firstly turns on the first switch SW1 and then turns off the second switch SW2. Upon completion of the process of S534, the first control circuit 30 returns to S520.

If the battery temperature is lower than the predetermined temperature (S532: NO), the first control circuit 30 proceeds to S540 and executes the processes of S540 and thereafter as described in the third biasing process.

In the second variation, when the battery temperature is higher than or equal to the predetermined temperature, the first switch SW1 can be promptly turned on to thereby translate the TCR of the temperature signal generation circuit 40 to the third TCR.

2-3. Third Embodiment

The battery pack 10 in the third embodiment corresponds to the battery pack 10 in the first embodiment that is partially modified. More specifically, the battery pack 10 in the third embodiment is different from the battery pack 10 in the first embodiment in terms of the configuration of the temperature signal generation circuit 40 and the process executed by the first control circuit 30. Thus, the following discussion focuses only on the configuration of the temperature signal generation circuit 40 and the process executed by the first control circuit 30.

2-3-1. Circuit Configuration of Battery Pack

Figure 15:
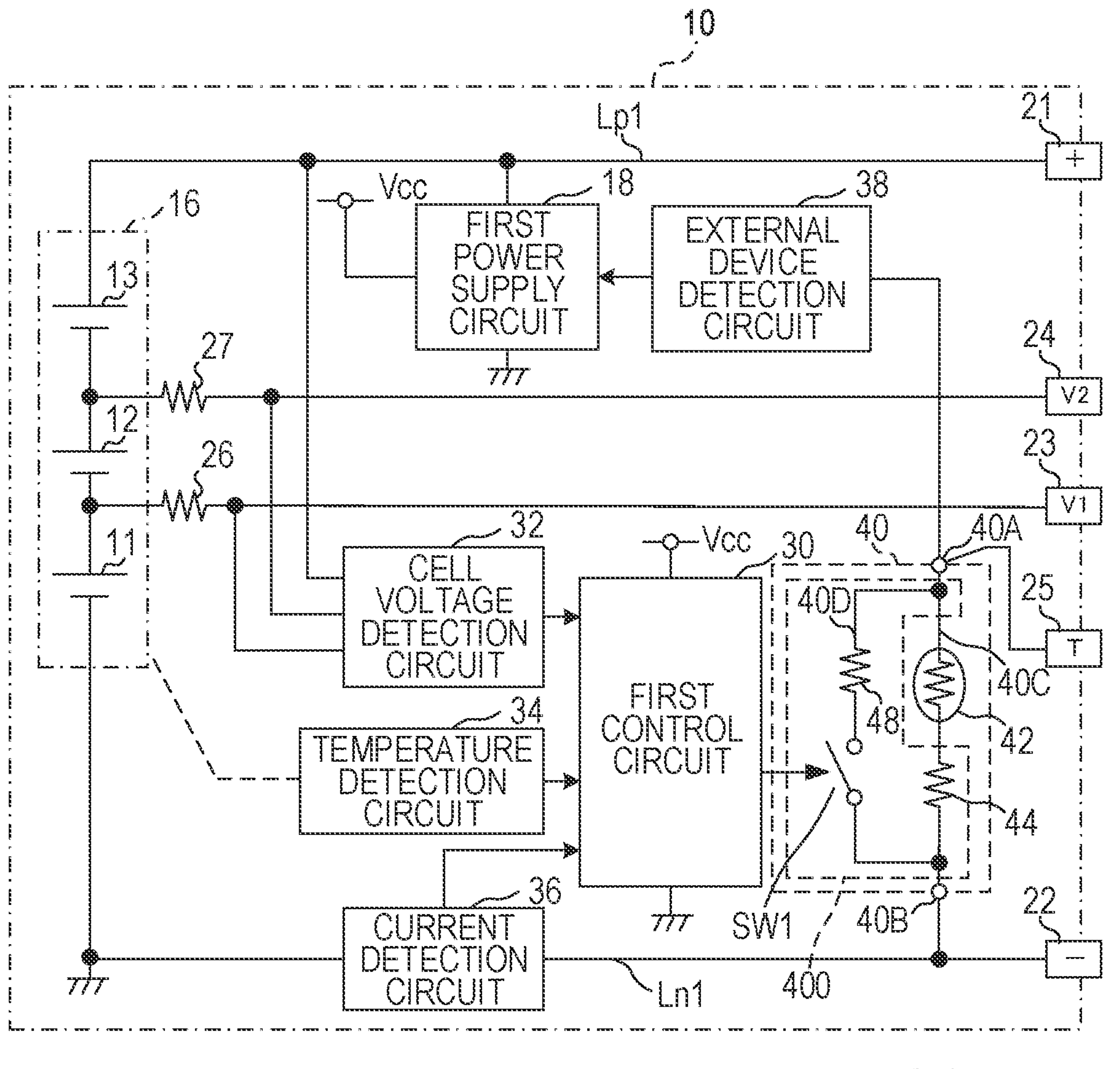
FIG. 15 is a block diagram showing a circuit configuration of a battery pack in a third embodiment.

As shown in FIG. 15, in the third embodiment, the inserted resistor 43 is removed from the temperature signal generation circuit 40 of the first embodiment. In addition, the temperature signal generation circuit 40 of the third embodiment includes the biasing circuit 400 partially modified.

In the biasing circuit 400 of the third embodiment, the second current path 40D is coupled in parallel with the first current path 40C (in other words, the temperature detection device 42 and the first serial resistor 44 coupled in series one another). In addition, the biasing circuit 400 of the third embodiment includes a second current-dividing resistor 48 coupled in series with the first switch SW1 on the second current path 40D.

When the first switch SW1 is in the off-state, the second current path 40D is interrupted. In this state, the resistance Rs of the temperature signal generation circuit 40 is equivalent to or approximate to the sum of (i) the resistance Rm of the temperature detection device 42 and (ii) the resistance R1 of the first serial resistor 44 (that is, Rs=Rm+R1, or Rs≈Rm+R1).

When the first switch SW1 is in the on-state, the second current path 40D is completed. In this state, the resistance Rs of the temperature signal generation circuit 40 is equivalent to or approximate to the combined resistance of (i) the resistance Rm of the temperature detection device 42, (ii) the resistance R1 of the first serial resistor 44, and (iii) the resistance R3 of the second current-dividing resistor 48 (that is, Rs=R3 (Rm+R1)/(R3+Rm+R1) or Rs≈R3·(Rm+R1)/(R3+Rm+R1)).

Thus, the resistance Rs when the first switch SW1 is in the on-state is smaller than the resistance Rs when the first switch SW1 is in the off-state.

Figure 16:
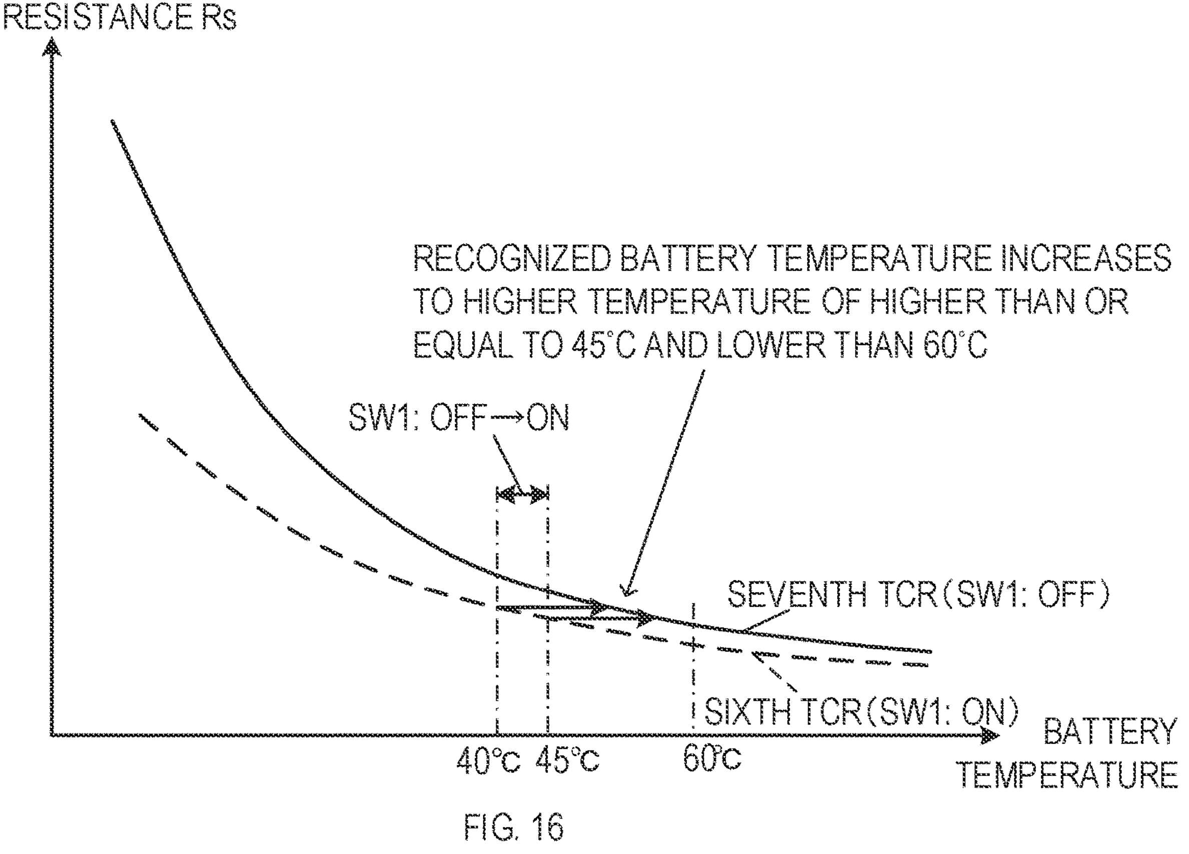
FIG. 16 schematically shows a translation of a temperature coefficient of resistance of a temperature signal generation circuit in the third embodiment.

The TCR of the temperature signal generation circuit 40 in the third embodiment is translated as shown in FIG. 16.

As shown in FIG. 16, the TCR of the temperature signal generation circuit 40 when the first switch SW1 is in the on-state (hereinafter, referred to as "sixth TCR") is lower than the TCR when the first switch SW1 is in the off-state (hereinafter, referred to as "seventh TCR").

The charger 50 recognizes the battery temperature in accordance with the seventh TCR shown in the solid line in FIG. 16. Therefore, the battery temperature recognized by the charger 50 increases when the first switch SW1 is switched from the off-state to the on-state.

2-3-2. Outline of Operations in Charger and Battery Pack

Figure 17:
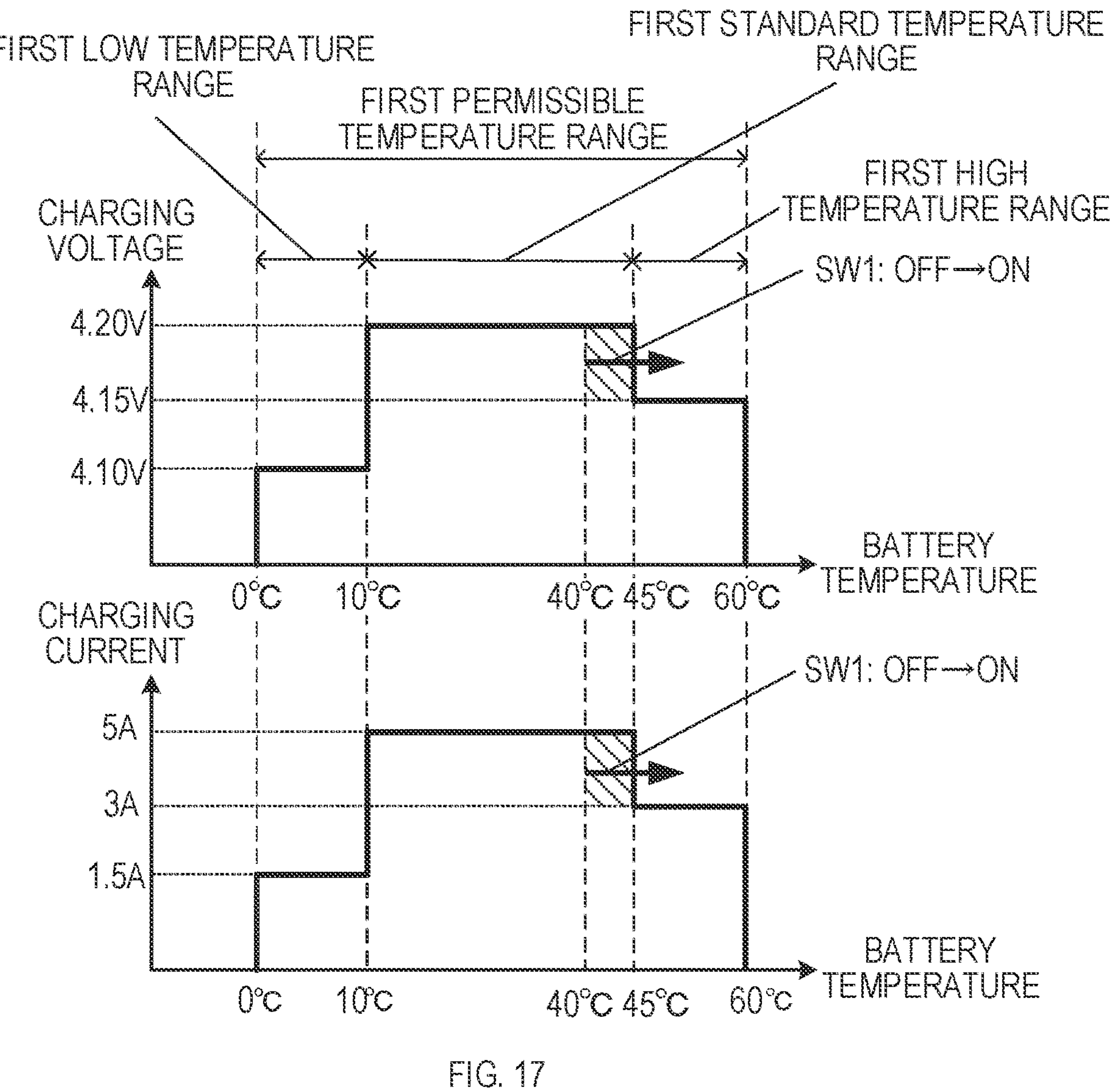
FIG. 17 schematically shows an adjustment to a charging operation in the third embodiment.

As shown in FIG. 17, the charger 50 of the third embodiment is set to perform a charging operation similar to that of the first embodiment.

In the basic operation, the first control circuit 30 of the battery pack 10 in the third embodiment maintains the first switch SW1 in the off-state (i.e. the TCR of the temperature signal generation circuit 40 is maintained at the seventh TCR).

The first control circuit 30 switches the first switch SW1 to the on-state when a third charging rate reduction requirement is satisfied. The third charging rate reduction requirement is satisfied when the battery temperature detected by the temperature detection circuit 34 is higher than or equal to 40 degrees Celsius and lower than 45 degrees Celsius. As a result, the TCR of the temperature signal generation circuit 40 is translated to the sixth TCR shown in the dotted line in FIG. 16.

The sixth TCR is set so that the charger 50 recognizes the actual battery temperature of higher than or equal to 40 degrees Celsius and lower than 45 degrees Celsius as the battery temperature of higher than or equal to 45 degrees Celsius and lower than 60 degrees Celsius. Thus, the charger 50 reduces the charging voltage and the charging current.

The numerical range ranging from 40 degrees Celsius to below 45 degrees Celsius in the third charging rate reduction requirement is merely an example, and the numerical range in the third charging rate reduction requirement is not limited to this range, and can be determined in accordance with the characteristics of the battery 16.

Even when the battery temperature is within the first standard temperature range, the battery pack 10 of the third embodiment makes the charger 50 reduce the charging voltage and the charging current so that a slow charging is performed, if the battery temperature reaches 40 degrees Celsius.

In other words, as in the cases of the battery packs 10 of the first and second embodiments, the battery pack 10 of the third embodiment can also adjust the charging operation of the charger 50 in accordance with the characteristics of the battery 16.

2-3-3. Details of Operation in Battery Pack

Figure 18:
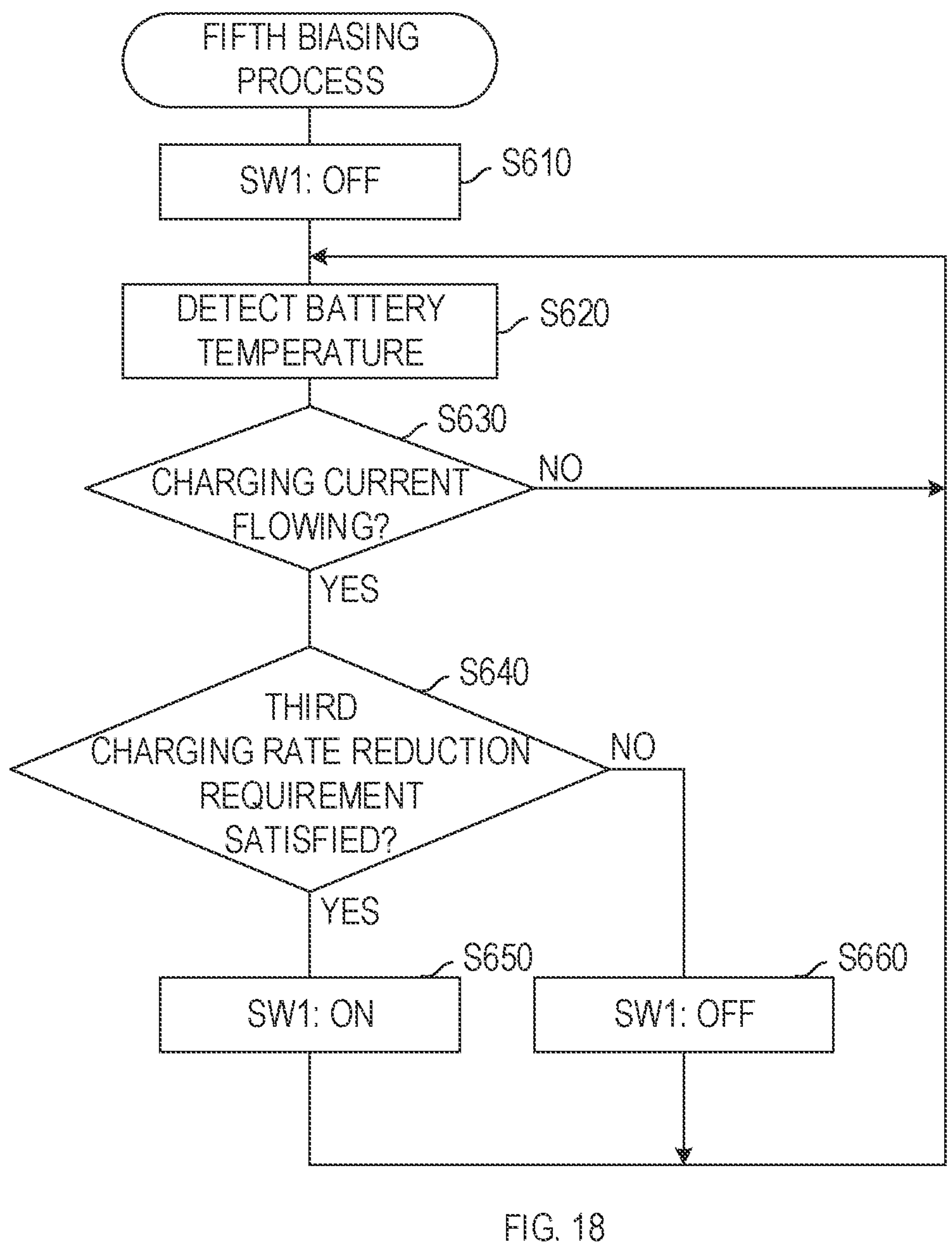
FIG. 18 is a flow chart showing a flow of a fifth biasing process.

The first control circuit 30 in the third embodiment executes a fifth biasing process shown in FIG. 18 in place of the first biasing process.

As shown in FIG. 18, the first control circuit 30 turns off the first switch SW1 in S610 and proceeds to S620.

In S620, the first control circuit 30 detects the battery temperature through the temperature detection circuit 34. Subsequently in S630, the first control circuit 30 determines whether the charging current is flowing from the external device (i.e. the charger 50) to the battery pack 10 based on the voltage of the current detection signal received from the current detection circuit 36.

If the charging current is not flowing (S630: NO), the first control circuit 30 returns to S620, and waits for the charging current to flow while repeatedly executing the processes of S620 and S630.

If the charging current is flowing (S630: YES), the first control circuit 30 proceeds to S640 and determines whether the third charging rate reduction requirement is satisfied. If the third charging rate reduction requirement is satisfied (that is, when the battery temperature is higher than or equal to 40 degrees Celsius and lower than 45 degrees Celsius) (S640: YES), the first control circuit 30 proceeds to S650 and turns on the first switch SW1. Upon completion of the process of S650, the first control circuit 30 returns to S620.

If the third charging rate reduction requirement is not satisfied (that is, when the battery temperature is lower than 40 degrees Celsius or higher than or equal to 45 degrees Celsius) (S640: NO), the first control circuit 30 proceeds to S660 and turns off the first switch SW1. Upon completion of the process of S660, the first control circuit 30 returns to S620.

2-3-4. Correspondence Between Terms

In the third embodiment, the second current path 40D corresponds to one example of the fourth current path in the overview of embodiments, the second current-dividing resistor 48 corresponds to one example of the third resistor in the overview of embodiments, and the first switch SW1 corresponds to one example of the third switch in the overview of embodiments. The range of the battery temperature ranging from 40 degrees Celsius to below 45 degrees Celsius corresponds to one example of the sixth temperature range in the overview of embodiments.

2-3-5. Third Variation

Figure 19:
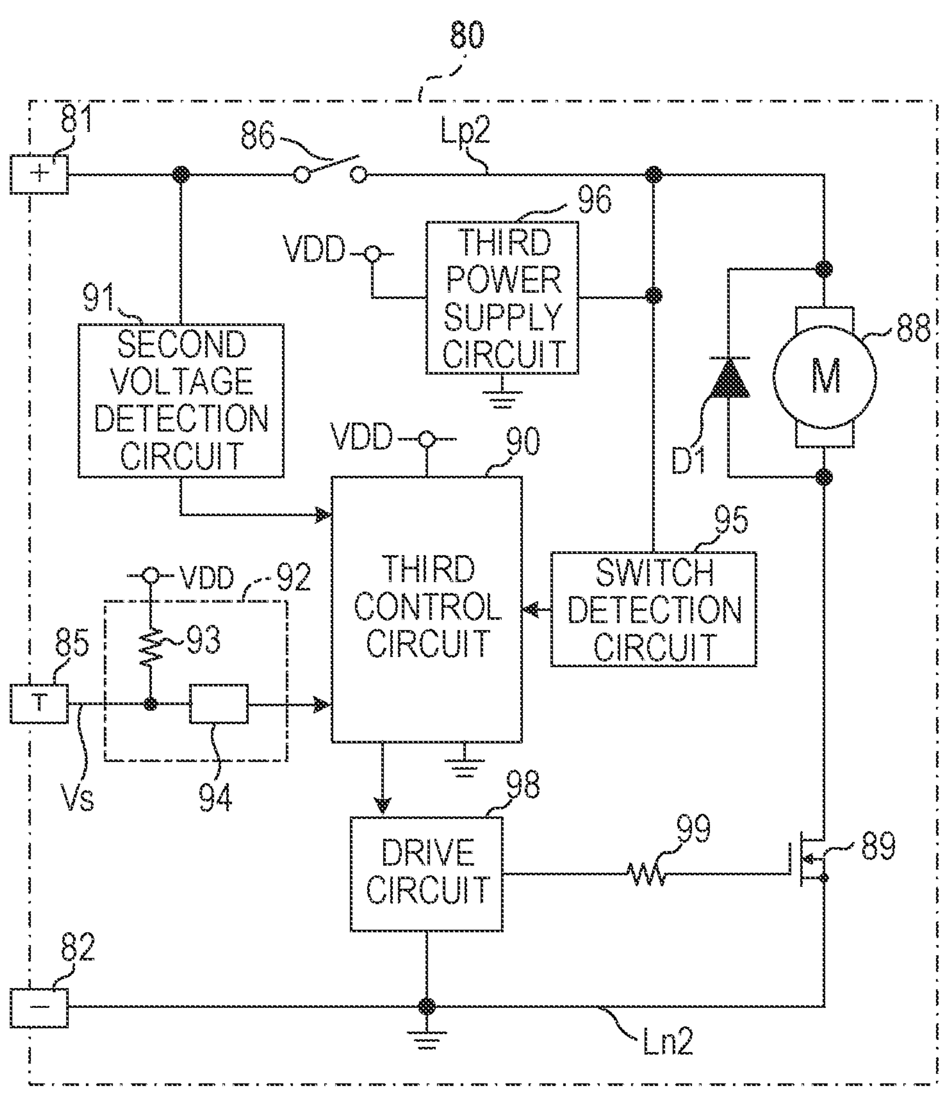
FIG. 19 is a block diagram showing a circuit configuration of an electric power tool in a third variation.

In a third variation, the battery pack 10 of the third embodiment shown in FIG. 15 is coupled to the electric power tool 80 shown in FIG. 19.

2-3-5-1. Circuit Configuration of Electric Power Tool

As shown in FIG. 19, the electric power tool 80 includes a second positive electrode terminal 81. The first power supply terminal 21 of the battery pack 10 is configured to be detachably coupled to the second positive electrode terminal 81. The electric power tool 80 includes a second negative electrode terminal 82. The second power supply terminal 22 of the battery pack 10 is configured to be detachably coupled to the second negative electrode terminal 82. The electric power tool 80 includes a second signal input terminal 85. The first signal output terminal 25 of the battery pack 10 is configured to be detachably coupled to the second signal input terminal 85.

The electric power tool 80 includes a motor 88. The motor 88 in the third variation is a brushed DC motor. The motor 88 includes a flyback diode D1 coupled in parallel with the motor 88. In other embodiments, the motor 88 may be in any other form, including a brushless DC motor and an AC motor.

The electric power tool 80 includes a second positive-side current path Lp2 configured to electrically couple the second positive electrode terminal 81 to a first terminal of the motor 88.

The electric power tool 80 includes a manual switch 86 on the second positive-side current path Lp2. The manual switch 86 is configured to be manually switched between an on-state and an off-state by a user of the electric power tool 80. When the manual switch 86 is turned on, the second positive-side current path Lp2 is completed. When the manual switch 86 is turned off, the second positive-side current path Lp2 is interrupted. The manual switch 86 in the third variation is a trigger switch. In other embodiments, the manual switch 80 may be in any other form, including a slide switch, a dial switch and a push button.

The electric power tool 80 includes a second negative-side current path Ln2 configured to electrically couple the second negative electrode terminal 82 to a second terminal of the motor 88. The second negative-side current path Ln2 is electrically coupled to the ground of the electric power tool 80. When the second power supply terminal 22 of the battery pack 10 is coupled to the second negative electrode terminal 82, the ground of the battery pack 10 (that is, the negative electrode of the battery 16) is electrically coupled to the ground of the electric power tool 80. As a result, the internal circuits in the battery pack 10 and in the electric power tool 80 share the same electrical reference potential.

The electric power tool 80 includes a third switch 89 on the second negative-side current path Ln2. The third switch 89 in the third variation is an FET. In other embodiments, the third switch 89 may be a semiconductor switch in any other form, including a bipolar transistor, an IGBT, and an SSR, or a mechanical relay.

The electric power tool 80 includes a second voltage detection circuit 91. The second voltage detection circuit 91 is coupled to the second positive-side current path Lp2 between the second positive electrode terminal 81 and a first contact of the manual switch 86. The second voltage detection circuit 91 receives the battery voltage applied to the second positive-side current path Lp2 from the battery pack 10 through the second positive electrode terminal 81 and outputs a third battery voltage detection signal. The third battery voltage detection signal indicates the magnitude of the battery voltage.

The electric power tool 80 includes a switch detection circuit 95. The switch detection circuit 95 is coupled to the second positive-side current path Lp2 between a second contact of the manual switch 86 and the first terminal of the motor 88. The switch detection circuit 95 receives the battery voltage when (i) the electric power tool 80 is coupled to the battery pack 10 and (ii) the manual switch 86 is turned on. The switch detection circuit 95 outputs a manual operation detection signal in response to the switch detection circuit 95 receiving the battery voltage. The manual operation detection signal indicates that the manual switch 86 is turned on.

The electric power tool 80 includes a third power supply circuit 96. The third power supply circuit 96 is coupled to the second positive-side current path Lp2 between the second contact of the manual switch 86 and the first terminal of the motor 88. The third power supply circuit 96 receives the battery voltage when (i) the electric power tool 80 is coupled to the battery pack 10 and (ii) the manual switch 86 is turned on. The third power supply circuit 96 reduces (or steps-down) the received battery voltage and generates a third supply voltage VDD for operating the internal circuits in the electric power tool 80. The third supply voltage VDD in the third variation is a fixed direct voltage. The third supply voltage VDD may be equal to, or approximate to, or different from the second supply voltage Vdd.

The electric power tool 80 includes a second temperature signal reception circuit 92. The second temperature signal reception circuit 92 is configured similarly to the first temperature signal reception circuit 57 in the charger 50.

Specifically, the second temperature signal reception circuit 92 includes a second pull-up resistor 93. The second pull-up resistor 93 includes a first end to which the third supply voltage VDD is applied. The second pull-up resistor 93 includes a second end coupled to the second signal input terminal 85.

The second temperature signal reception circuit 92 includes a second filter circuit 94. When the electric power tool 80 is coupled to the battery pack 10, the second filter circuit 94 receives the temperature signal from the temperature signal generation circuit 40 of the battery pack 10 through the first signal output terminal 25 and the second signal input terminal 85. The second filter circuit 94 removes a noise component (e.g. a high frequency component higher than or equal to a predetermined frequency) from the received temperature signal and outputs the temperature signal without the noise component.

The electric power tool 80 includes a drive circuit 98. The drive circuit 98 is coupled to the third switch 89 through a third current-limiting resistor 99. The drive circuit 98 (*i*) receives a drive command and (ii) turns on or off the third switch 89 in accordance with the received drive command.

The electric power tool 80 includes a third control circuit 90. The third control circuit 90 in the third variation includes a microcomputer including a CPU, a ROM, a RAM, and the like similarly to the first control circuit 30 of the battery pack 10. In other embodiments, in addition to or in place of the microcomputer, the third control circuit 90 may include a wired logic, an ASIC, an ASSP, a programmable logic device, a discrete electronic component, and/or a combination of these.

The third control circuit 90 receives the manual operation detection signal from the switch detection circuit 95 and outputs the drive command to the drive circuit 98.

The drive command in the third variation is a pulse width modulated signal having a duty ratio. The drive circuit 98 turns on or off the third switch 89 in accordance with the duty ratio of the drive command to thereby drive the motor 88. In response to the motor 88 being driven, a not-shown tool element operates.

When the third control circuit 90 does not receive the manual operation detection signal, it stops the output of the drive command. The third switch 89 is thereby turned off, and the motor 88 stops.

While receiving the manual operation detection signal (i.e. while an electric power is delivered from the battery 16 to the motor 88), the third control circuit 90 executes a temperature protection control.

In the temperature protection control, the third control circuit 90 monitors the voltage Vs of the temperature signal received from the second temperature signal reception circuit 92. When the voltage Vs is lower than or equal to a predetermined threshold, the third control circuit 90 turns off the third switch 89 through the drive circuit 98 and forcibly stops the discharge from the battery 16 to the motor 88.

The predetermined threshold in the electric power tool 80 is set independently from the characteristics of the battery 16. That is, the third control circuit 90 executes the temperature protection control based on the voltage Vs of the temperature signal without identifying the characteristics of the battery 16.

The third control circuit 90 receives the third battery voltage detection signal from the second voltage detection circuit 91 and recognizes the magnitude of the battery voltage based on the third battery voltage detection signal received. The third control circuit 90 executes an over discharge protection control based on the magnitude of the recognized battery voltage without identifying the characteristics of the battery 16.

In the over discharge protection control, the third control circuit 90 stops the output of the drive command and turns off the third switch 89 when the battery voltage decreases to a specified voltage.

The first control circuit 30 of the battery pack 10 monitors a state of the battery 16 based on the signals output from the cell voltage detection circuit 32, the temperature detection circuit 34, and the current detection circuit 36 when the discharge from the battery 16 to the electric power tool 80 starts. The first control circuit 30 turns on the first switch SW1 when the first control circuit 30 recognizes that the battery 16 falls into an over-discharge state.

2-3-5-2. Details of Operation in Battery Pack

Figure 20:
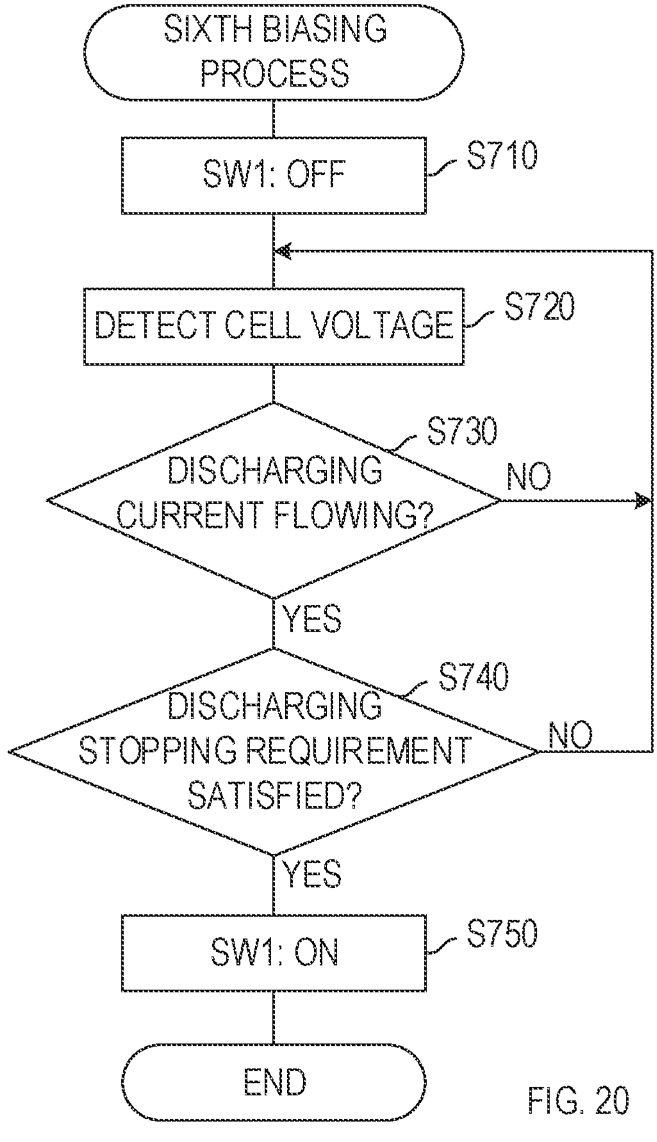
FIG. 20 is a flow chart showing a flow of a sixth biasing process.

In this third variation, the first control circuit 30 of the battery pack 10 executes a sixth biasing process shown in FIG. 20 in place of or in addition to the fifth biasing process. The first control circuit 30 executes the sixth biasing process when the battery pack 10 is coupled to the electric power tool 80.

As shown in FIG. 20, the first control circuit 30 turns off the first switch SW1 in S710 and proceeds to S720. In S720, the first control circuit 30 detects the cell voltage through the cell voltage detection circuit 32.

Subsequently in S730, the first control circuit 30 determines whether the discharging current is flowing from the battery 16 to the external device (which is the electric power tool 80 in the third variation) based on the voltage of the current detection signal received from the current detection circuit 36. The discharging current flows from the battery 16 to the motor 88 of the electric power tool 80 coupled to the battery pack 10 when the motor 88 is driven.

If the discharging current is not flowing (S730: NO), the first control circuit 30 returns to S720 and waits for the motor 88 to be driven while repeatedly executing the processes of S720 and S730.

If the discharging current is flowing (S730: YES), the first control circuit 30 proceeds to S740, and determines whether a discharging stopping requirement is satisfied. The discharging stopping requirement in the third variation is satisfied in response to the cell voltage detected in S720 being lower than a voltage threshold (which is 3 volts in the third variation).

The numerical value of 3 volts in the discharging stopping requirement is merely an example. The voltage threshold in the discharging stopping requirement is not limited to this numerical value, but can be determined in accordance with the characteristics of the battery 16.

If the discharging stopping requirement is not satisfied (S740: NO), the first control circuit 30 returns to S720. If the discharging stopping requirement is satisfied (S740: YES), the first control circuit 30 proceeds to S750 and turns on the first switch SW1. Upon completion of the process of S750, the first control circuit 30 ends the sixth biasing process.

When the first switch SW1 is switched to the on-state in S750, the resistance Rs of the temperature signal generation circuit 40, and thus the voltage Vs of the temperature signal decreases. With the temperature signal having the voltage Vs thus biased, the battery temperature recognized by the third control circuit 90 of the electric power tool 80 increases, and the discharge from the battery 16 to the motor 88 is forcibly stopped.

2-3-5-3. Effects in Third Variation

In the battery pack 10 of the third variation, the first switch SW1 is turned on when the discharging stopping requirement is satisfied.

In response to (i) the first switch SW1 being turned on and (ii) the resistance Rs of the temperature signal generation circuit 40 decreasing (i.e., in response to the TCR of the temperature signal generation circuit 40 being translated from the seventh TCR to the sixth TCR), the electric power tool 80 recognizes the battery temperature increased to a higher temperature of higher than or equal to 45 degrees Celsius and lower than 60 degrees Celsius as shown in FIG. 16, and stops the discharging operation.

Therefore, the battery pack 10 can forcibly stop the discharging operation of the electric power tool 80, i.e. the discharge from the battery 16 to the motor 88, when the discharging stopping requirement is satisfied.

In other words, the battery pack 10 can adjust the discharging operation of the electric power tool 80 in accordance with the characteristics of the battery 16, and thus effectively inhibit the deterioration of the battery 16.

In place of or in addition to the cell voltage, the discharging stopping requirement may be satisfied in response to the battery voltage, the battery temperature and/or the magnitude of the discharging current having exceeded their respective thresholds.

2-4. Reference Example

The battery pack 10 in the reference example corresponds to the battery pack 10 in the first embodiment that is partially modified. More specifically, the battery pack 10 in the reference example is different from the battery pack 10 in the first embodiment in terms of a configuration of the temperature signal generation circuit 40 and the process executed by the first control circuit 30. Thus, the following description focuses only on the configuration of the temperature signal generation circuit 40 and the process executed by the first control circuit 30.

2-4-1. Circuit Configuration of Battery Pack

Figure 21:
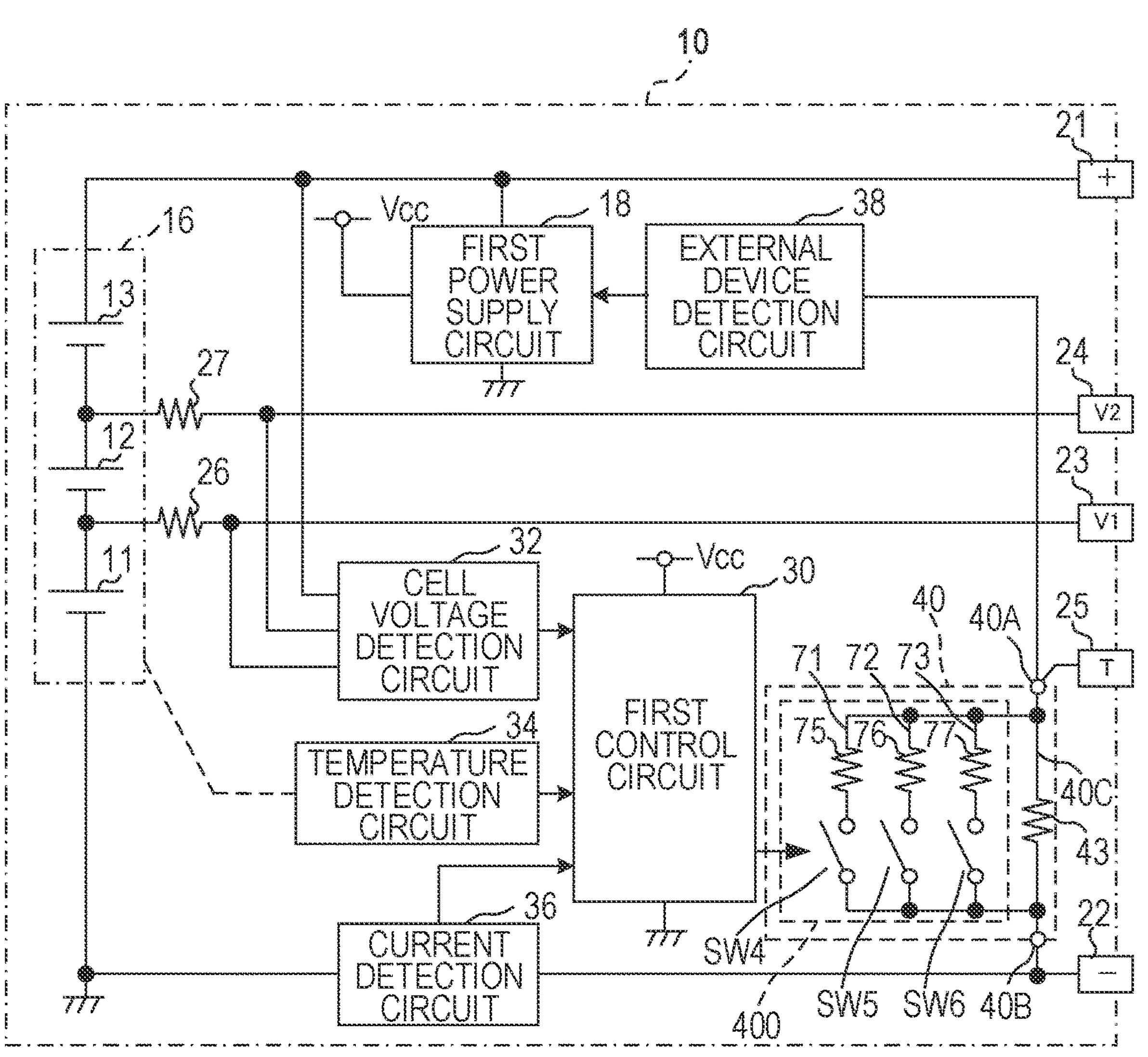
FIG. 21 is a block diagram showing a circuit configuration of a battery pack in a reference example.

As shown in FIG. 21, in the reference example, the temperature detection device 42 is removed from the temperature signal generation circuit 40 of the first embodiment. In addition, the temperature signal generation circuit 40 of the reference example includes the biasing circuit 400 completely modified.

In place of the first serial resistor 44, the second current path 40D, and the first switch SW1, the biasing circuit 400 of the reference example includes first through third branches 71-73 coupled in parallel with the inserted resistor 43.

The first branch 71 includes a third current-dividing resistor 75 and a fourth switch SW4 coupled in series with one another on the first branch 71. The fourth switch SW4 is configured to be switched between an on-state and an off-state by the first control circuit 30. When the fourth switch SW4 is in the off-state, the first branch 71 is interrupted. When the fourth switch SW4 is in the on-state, the first branch 71 is completed.

The second branch 72 includes a fourth current-dividing resistor 76 and a fifth switch SW5 coupled in series with one another on the second branch 72. The fifth switch SW5 is configured to be switched between an on-state and an off-state by the first control circuit 30. When the fifth switch SW5 is in the off-state, the second branch 72 is interrupted. When the fifth switch SW5 is in the on-state, the second branch 72 is completed.

The third branch 73 includes a fifth current-dividing resistor 77 and a sixth switch SW6 coupled in series with one another on the third branch 73. The sixth switch SW6 is configured to be switched between an on-state and an off-state by the first control circuit 30. When the sixth switch SW6 is in the off-state, the third branch 73 is interrupted. When the sixth switch SW6 is in the on-state, the third branch 73 is completed.

Each of the fourth through sixth switches SW4-SW6 may be a semiconductor switch in any form, including an FET, a bipolar transistor, an IGBT, and an SSR, or a mechanical relay. At least one of the fourth through sixth switches SW4-SW6 may be a switch in any other form different from the rest of the fourth through sixth switches SW4-SW6. The fourth through sixth switches SW4-SW6 may be different from each other.

The inserted resistor 43 and the third through fifth current-dividing resistors 75-77 have the respective resistances Ra, R4-R6 set as follows.

The resistance Ra of the inserted resistor 43 is set so that the charger 50 recognizes the battery temperature of 5 degrees Celsius when all the fourth through sixth switches SW4-SW6 are in their respective off-states, that is, when the resistance Rs of the temperature signal generation circuit 40 is equivalent to or approximate to the resistance Ra (that is, Rs=R1 or Rs≈R1). The numerical value of 5 degrees Celsius is merely an example, and the battery temperature recognized by the charger 50 when all the fourth through sixth switches SW4-SW6 are in their respective off-states is not be limited to such a numeral value, but can be determined in accordance with the characteristics of the battery 16.

The resistance R4 of the third current-dividing resistor 75 is set so that the charger 50 recognizes the battery temperature of 30 degrees Celsius when (i) the fourth switch SW4 is in the on-state and (ii) the fifth and sixth switches SW5 and SW6 are in their respective off-states, that is, when the resistance Rs of the temperature signal generation circuit 40 is equivalent to or approximate to the combined resistance of the resistance Ra and the resistance R4 (that is, Rs=Ra·R4/(Ra+R4) or Rs Ra·R4/(Ra+R4)). The numerical value of 30 degrees Celsius is merely an example and the battery temperature recognized by the charger 50 when (i) the fourth switch SW4 is in the on-state and (ii) the fifth and sixth switches SW5 and SW6 are in their respective off-state is not be limited to such a numerical value, but can be determined in accordance with the characteristics of the battery 16.

The resistance R5 of the fourth current-dividing resistor 76 is set so that the charger 50 recognizes the battery temperature of 50 degrees Celsius when (i) the fifth switch SW5 is in the on-state and (ii) the fourth and sixth switches SW4 and SW6 are in their respective off-states, that is, when the resistance Rs of the temperature signal generation circuit 40 is equivalent to or approximate to the combined resistance of the resistance Ra and the resistance R5 (that is, Rs=Ra·R5/(Ra+R5) or Rs≈Ra R5/(Ra+R5)). The numerical value of 50 degrees Celsius is merely an example and the battery temperature recognized by the charger 50 when (i) the fifth switch SW5 is in the on-state and (ii) the fourth and sixth switches SW4 and SW6 are in their respective off-states is not be limited to such a numerical value, but can be determined in accordance with the characteristics of the battery 16.

The resistance R6 of the fifth current-dividing resistor 77 is set so that the charger 50 recognizes the battery temperature of 70 degrees Celsius when (i) the sixth switch SW6 is in the on-state and (ii) the fourth and fifth switches SW4 and SW5 are in their respective off-states, that is, when the resistance Rs of the temperature signal generation circuit 40 is equivalent to or approximate to the combined resistance value of the resistance Ra and the resistance R6 (that is, Rs=Ra R6/(Ra+R6) or Rs Ra R6/(Ra+R6)). The numerical value of 70 degrees Celsius is merely an example and the battery temperature recognized by the charger 50 when (i) the sixth switch SW6 is in the on-state and (ii) the fourth and fifth switches SW4 and SW5 are in their respective off-states is not be limited to such a numerical value, but can be determined in accordance with the characteristics of the battery 16.

2-4-2. Outline of Charging Operation in Charger

Figure 22:
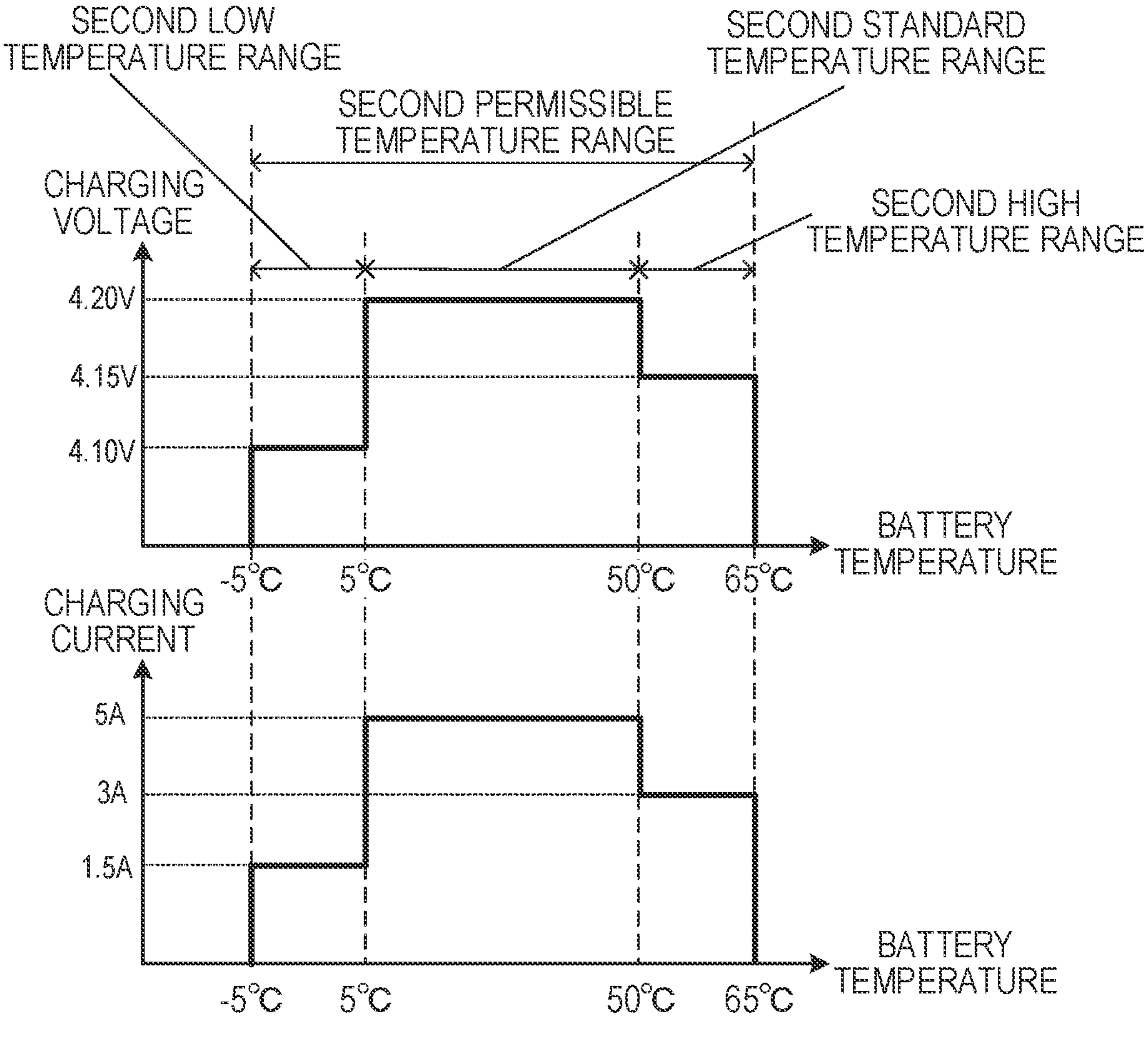
FIG. 22 schematically shows a charging operation of a charger in the reference example.

As shown in FIG. 22, the charger 50 of the reference example is set to perform charging of the battery 16 when the battery temperature is within a second permissible temperature range (ranging from −5 degrees Celsius to 65 degrees Celsius in the reference example). The charger 50 is set to stop charging of the battery 16 when the battery temperature is outside the second permissible temperature range (that is, when the battery temperature is lower than −5 degrees Celsius or higher than 65 degrees Celsius).

The charger 50 is set to maintain (i) the charging voltage (specifically, the respective cell voltages of the first through third battery cells 11-13) at 4.2 volts and (ii) the charging current at 5 amperes, when the battery temperature is within a second standard temperature range (ranging from above 5 degrees Celsius to below 50 degrees Celsius in the reference example).

The numerical values of 4.2 volts and 5 amperes are merely examples, and the magnitudes of the charging voltage and the charging current in the second standard temperature range are not limited to these numerical values.

The charger 50 is set to reduce the charging voltage and the charging current in comparison with the case where the battery temperature is within the second standard temperature range when the battery temperature is (i) within a second low temperature range (ranging from −5 degrees Celsius to 5 degrees Celsius in the reference example) lower than the second standard temperature range or (ii) within a second high temperature range (ranging from 50 degrees Celsius to 65 degrees Celsius in the reference example) higher than the second standard temperature range.

In one example, the charger 50 is set to (i) maintain the charging voltage at 4.1 volts and the charging current at 1.5 amperes within the second low temperature range and (ii)

maintain the charging voltage at 4.15 volts and the charging current at 3 amperes within the second high temperature range.

The numerical values of 4.1 volts, 4.15 volts, 1.5 amperes and 3 amperes are merely examples, and the magnitudes of the charging voltage and the charging current in the second low temperature range and the second high temperature range are not limited to these numerical values.

2-4-3. Details of Operation in Battery Pack

Figure 23:
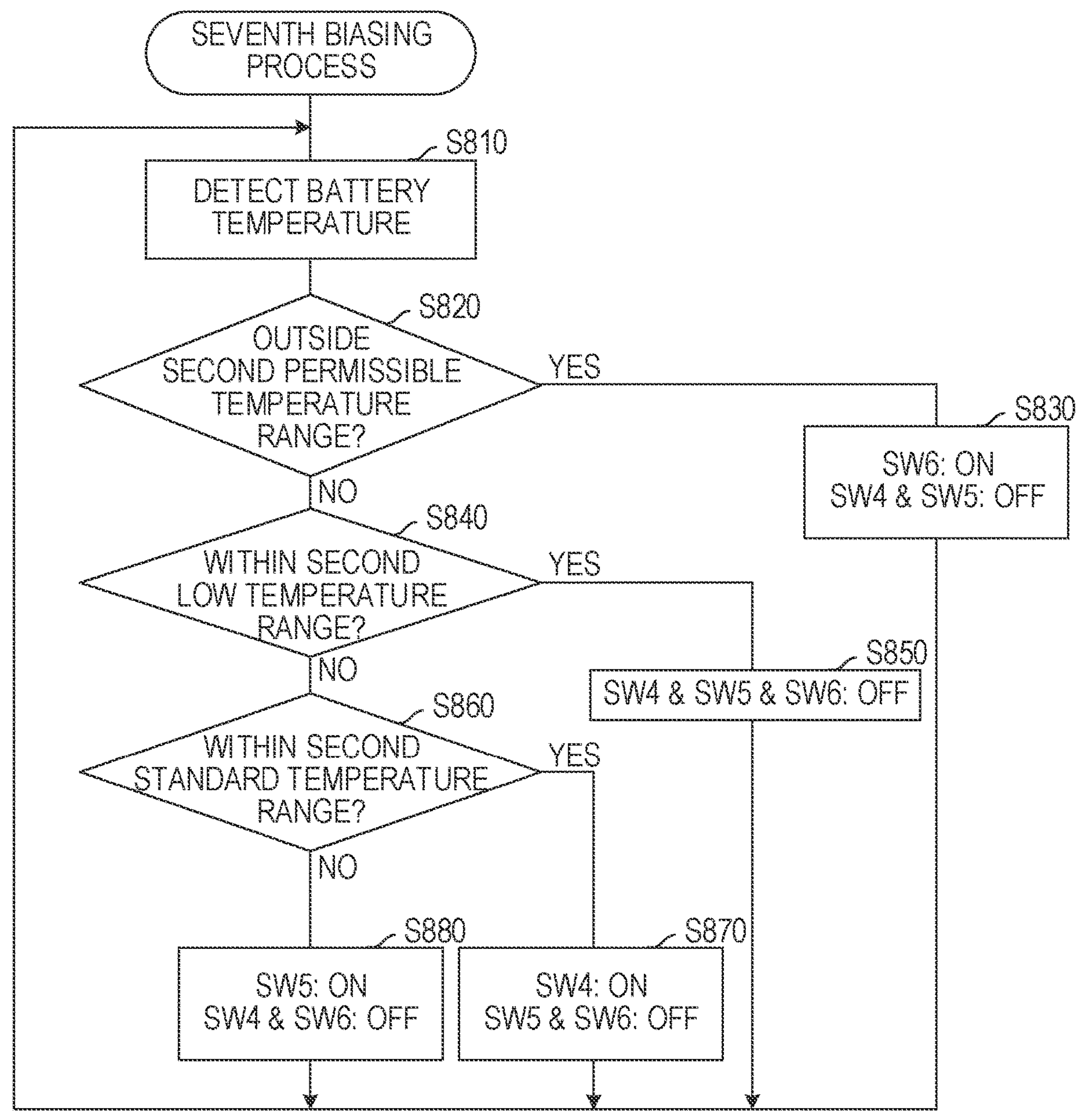
FIG. 23 is a flow chart showing a flow of a seventh biasing process.

The first control circuit 30 in the reference example executes a seventh biasing process shown in FIG. 23 in place of the first biasing process.

As shown in FIG. 23, the first control circuit 30 detects the battery temperature through the temperature detection circuit 34 in S810. Subsequently in S820, the first control circuit 30 determines whether the battery temperature is outside the second permissible temperature range.

If the battery temperature is outside the second permissible temperature range (S820: YES), the first control circuit 30 proceeds to S830 and (i) turns on the sixth switch SW6 and (ii) turns off the fourth and fifth switches SW4 and SW5, and then returns to S810. Upon completion of the process of S830, the charger 50 recognizes the battery temperature of 70 degrees Celsius and stops charging of the battery 16.

If the battery temperature is within the second permissible temperature range (S820: NO), the first control circuit 30 proceeds to S840, and determines whether the battery temperature is within the second low temperature range. If the battery temperature is within the second low temperature range (S840: YES), the first control circuit 30 proceeds to S850 and turns off the fourth through sixth switches SW4-SW6 and returns to S810.

Upon completion of the process of S850, the charger 50 recognizes the battery temperature of 5 degrees Celsius and performs charging of the battery 16 at the charging rate corresponding to the battery temperature of 5 degrees Celsius.

If the battery temperature is outside the second low temperature range (S840: NO), the first control circuit 30 proceeds to S860, and determines whether the battery temperature is within the second standard temperature range. If the battery temperature is within the second standard temperature range (S860: YES), the first control circuit 30 proceeds to S870 and (i) turns on the fourth switch SW4 and (ii) turns off the fifth and sixth switches SW5 and SW6, and then returns to S810.

Upon completion of the process of S870, the charger 50 recognizes the battery temperature of 30 degrees Celsius and performs charging of the battery 16 at the charging rate corresponding to the battery temperature of 30 degrees Celsius.

If the battery temperature is outside the second standard temperature range (S860: NO), the first control circuit 30 proceeds to S880 and (i) turns on the fifth switch SW5 and (ii) turns off the fourth and sixth switches SW4 and SW6, and then returns to S810.

Upon completion of the process of S880, the charger 50 recognizes the battery temperature of 50 degrees Celsius and performs charging of the battery 16 at the charging rate corresponding to the battery temperature of 50 degrees Celsius.

The first control circuit 30 may turn on at least two of the fourth through sixth switches SW4-SW6 in S830, S870 or S880.

2-4-4. Effects in Reference Example

The battery pack 10 of the reference example can adjust the charging operation of the charger 50 or the discharging operation of the electric power tool 80 in accordance with the characteristics of the battery 16 similarly to the first through third embodiments.

2-5. Further Embodiments

Although the embodiments, the variations, and the reference example of the present disclosure have been described above, it should be appreciated that the present disclosure is not limited to the embodiments, the variations, and the reference example as described above and can take various forms.

In further embodiments, the biasing circuit 400 is not necessarily a part of the temperature signal generation circuit 40, but may be independent from the temperature signal generation circuit 40.

In further embodiments, the number of the current paths, the number of the resistors, or the number of the switches in the temperature signal generation circuit 40 may be appropriately changed.

In further embodiments, the battery pack 10 may include the temperature signal generation circuit 40 of the first embodiment without the inserted resistor 43.

In further embodiments, instead of the second supply voltage Vdd or the third supply voltage VDD, the first supply voltage Vcc may be applied to the first terminal 40A of the temperature signal generation circuit 40 through a pull-up resistor.

In further embodiments, the first supply voltage Vcc, the second supply voltage Vdd, or the third supply voltage VDD may be applied to the first terminal 40A of the temperature signal generation circuit 40 without going through a pull-up resistor. In this case, the second terminal 40B of the temperature signal generation circuit 40 may be coupled to the ground of the battery pack 10, the ground of the charger 50, or the ground of the electric power tool 80 through a pull-down resistor. In addition, the battery pack 10 may additionally include the second signal output terminal coupled to the second terminal 40B.

The battery pack 10 configured in this way can output a voltage across the first signal output terminal 25 and the second signal output terminal as the temperature signal.

The charging operations of the charger 50 in the first through third embodiments, the first and second variations, and the reference example are merely examples, and the charging operation relative to the battery temperature (i.e. the control of the charging voltage and/or the charging current) can be arbitrarily set.

In this case, the translation of the resistance Rs or the TCR of the temperature signal generation circuit 40 may be adjusted appropriately in accordance with the charging operation of the charger 50 arbitrarily set.

In further embodiments, the battery pack 10 of the first embodiment, the first variation, the second embodiment, the second variation, or the reference example may be coupled to the electric power tool 80.

A function served by a single element in any of the above-described embodiments may be achieved by two or more elements, or a function served by two or more elements may be achieved by a single element. At least a part of the configurations of the above described embodiments may be replaced with a well-known configuration having a similar function. A part of the configurations of the aforementioned embodiments may be omitted. Furthermore, at least part of the configurations of the aforementioned embodiments may be added to or replaced with the configurations of the other above-described embodiments. Any form included in the technical idea identified in the overview of embodiments is an embodiment of the present disclosure.

What is claimed is:

1. A battery pack comprising:

a rechargeable battery including (i) a positive electrode, (ii) a negative electrode, and (iii) at least one battery cell;

a first power supply terminal configured to be detachably coupled to a positive electrode terminal of an external device;

a second power supply terminal configured to be detachably coupled to a negative electrode terminal of the external device;

a first signal terminal configured to be detachably coupled to a first corresponding terminal of the external device;

a second signal terminal configured to be detachably coupled to a second corresponding terminal of the external device;

a positive-side current path (i) electrically coupling the first power supply terminal to the positive electrode of the rechargeable battery or (ii) configured to electrically couple the first power supply terminal to the positive electrode of the rechargeable battery;

a negative-side current path (i) electrically coupling the second power supply terminal to the negative electrode of the rechargeable battery or (ii) configured to electrically couple the second power supply terminal to the negative electrode of the rechargeable battery;

a temperature signal generation circuit (i) including a temperature detection device and (ii) configured to generate a temperature signal across the first signal terminal and the second signal terminal, the temperature detection device having a variable resistance that is dependent on a battery temperature, the temperature signal having a voltage associated with the variable resistance, and the battery temperature corresponding to a temperature of (i) the rechargeable battery or (ii) the at least one battery cell;

a biasing circuit configured to vary a physical electrical resistance of the biasing circuit to thereby bias the voltage of the temperature signal, wherein the voltage biased makes the external device reduce or stop (i) charging from the external device to the rechargeable battery and/or (ii) discharging from the rechargeable battery to the external device; and a control circuit configured to operate the biasing circuit based on a battery status, the battery status corresponding to (i) a status of the rechargeable battery and/or (ii) a status of the at least one battery cell.

2. The battery pack according to claim 1, wherein:

the temperature signal generation circuit includes a pair of terminals (i) respectively coupled to the first signal terminal and the second signal terminal and (ii) configured to receive an input voltage across the pair of terminals at least through a voltage dividing resistor, the input voltage being divided by at least (i) the voltage dividing resistor and (ii) an overall physical electrical resistance of the temperature signal generation circuit across the pair of terminals, and the overall physical electrical resistance across the pair of terminals being associated with the variable resistance;

the temperature signal generation circuit is configured to generate the temperature signal having the voltage based on the overall physical electrical resistance across the pair of terminals in response to an electric current flowing across the pair of terminals through the temperature detection device; and the biasing circuit is configured to vary the overall physical electrical resistance across the pair of terminals by varying the physical electrical resistance of the biasing circuit to thereby bias the voltage of the temperature signal.

3. The battery pack according to claim 2, wherein the external device includes (i) the voltage dividing resistor and/or (ii) a power supply configured to apply the input voltage across the pair of terminals through the voltage dividing resistor, the first corresponding terminal, and the second corresponding terminal.

4. The battery pack according to claim 2, wherein:

the temperature signal generation circuit includes a first current path electrically coupling the pair of terminals with one another; and the temperature detection device is on the first current path.

5. The battery pack according to claim 4, wherein:

the biasing circuit includes a first resistor (i) on the first current path and (ii) coupled in series with the temperature detection device; and the biasing circuit is configured to vary the overall physical electrical resistance across the pair of terminals at least with the first resistor.

6. The battery pack according to claim 5, wherein:

the biasing circuit includes:

a second current path coupled in parallel with the first resistor; and a first switch (i) on the second current path and (ii) configured to be switched between an on-state and an off-state, the first switch in the on-state being configured to complete the second current path, and the first switch in the off-state being configured to interrupt the second current path; and the control circuit is configured to switch the first switch either to the on-state or to the off-state based on the battery status.

7. The battery pack according to claim 6, wherein:

the control circuit is configured to:

switch the first switch to the on-state at least based on the battery temperature being outside a first temperature range; and switch the first switch to the off-state at least based on the battery temperature being within the first temperature range; and a combined resistance of the temperature detection device and the first resistor, when (i) the battery temperature is within the first temperature range and (ii) the first switch is in the off-state, is set such that the temperature signal has the voltage that makes the external device (i) stop charging from the external device to the rechargeable battery or (ii) reduce a charging rate from the external device to the rechargeable battery.

8. The battery pack according to claim 7, wherein:

the control circuit is configured to:

switch the first switch to the on-state at least based on the battery temperature being outside (i) the first temperature range and (ii) a second temperature range; and switch the first switch to the off-state at least based on the battery temperature being within the second temperature range, the second temperature range being distinct from the first temperature range;

the combined resistance of the temperature detection device and the first resistor, when (i) the battery temperature is within the first temperature range and (ii) the first switch is in the off-state, is set such that the temperature signal has the voltage that makes the external device stop charging from the external device to the rechargeable battery; and the combined resistance of the temperature detection device and the first resistor, when (i) the battery temperature is within the second temperature range and (ii) the first switch is in the off-state, is set such that the temperature signal has the voltage that makes the external device reduce the charging rate from the external device to the rechargeable battery.

9. The battery pack according to claim 6, wherein:

the biasing circuit includes:

a third current path (i) distinct from the second current path and (ii) coupled in parallel with the first resistor;

a second resistor on the third current path; and a second switch (i) coupled in series with the second resistor on the third current path and (ii) configured to be switched between an on-state and an off-state, the second switch in the on-state being configured to complete the third current path, and the second switch in the off-state being configured to interrupt the third current path; and the control circuit is configured to (i) switch the first switch either to the on-state or to the off-state and (ii) switch the second switch either to the on-state or to the off-state, based on the battery status.

10. The battery pack according to claim 9, wherein:

the control circuit is configured to:

(i) switch the first switch to the on-state and (ii) switch the second switch either to the on-state or to the off-state, at least based on the battery temperature being within a third temperature range;

(i) switch the first switch to the off-state and (ii) switch the second switch to the on-state, at least based on the battery temperature being within a fourth temperature range; and switch the first switch and the second switch to their respective off-states at least based on the battery temperature being within a fifth temperature range, the third temperature range, the fourth temperature range, and the fifth temperature range being distinct from one another;

a combined resistance of the temperature detection device, the first resistor, and the second resistor, when (i) the battery temperature is within the fourth temperature range, (ii) the first switch is in the off-state, and (iii) the second switch is in the on-state, is set such that the temperature signal has the voltage that makes the external device reduce Ha charging rate from the external device to the rechargeable battery; and a combined resistance of the temperature detection device and the first resistor, when (i) the battery temperature is within the fifth temperature range and (ii) the first switch and the second switch are in their the respective off-states, is set such that the temperature signal has the voltage that makes the external device stop charging from the external device to the rechargeable battery.

11. The battery pack according to claim 10, wherein the control circuit is configured to switch the second switch to the on-state and subsequently switch the first switch to the off-state, at least based on the battery temperature being within the fourth temperature range.

12. The battery pack according to claim 5, wherein:

the biasing circuit includes:

a fourth current path coupled in parallel with the first current path;

a third resistor on the fourth current path; and a third switch (i) coupled in series with the third resistor on the fourth current path and (ii) configured to be switched between an on-state and an off-state, the third switch in the on-state being configured to complete the fourth current path, and the third switch in the off-state being configured to interrupt the fourth current path; and the control circuit is configured to switch the third switch either to the on-state or to the off-state based on the battery status.

13. The battery pack according to claim 12, wherein:

the control circuit is configured to:

switch the third switch to the off-state at least based on the battery temperature being outside a sixth temperature range; and switch the third switch to the on-state at least based on the battery temperature being within the sixth temperature range; and a combined resistance of the temperature detection device, the first resistor, and the third resistor, when (i) the battery temperature is within the sixth temperature range and (ii) the third switch is in the on-state, is set such that the temperature signal has the voltage that makes the external device reduce its-a charging rate from the external device to the rechargeable battery.

14. The battery pack according to claim 1, wherein the temperature detection device (i) has a negative temperature coefficient and (ii) is configured such that the variable resistance decreases in accordance with an increase in the battery temperature.

15. The battery pack according to claim 1, wherein:

the negative electrode terminal of the external device is common with the second corresponding terminal of the external device; and the second power supply terminal of the battery pack is common with the second signal terminal of the battery pack.

16. The battery pack according to claim 1, further comprising:

a temperature detection circuit configured to detect the battery temperature; and/or a voltage detection circuit configured to detect a battery voltage, the battery voltage corresponding to a voltage of (i) the rechargeable battery or (ii) the at least one battery cell, and wherein the battery status includes (i) the battery temperature detected by the temperature detection circuit, and/or (ii) the battery voltage detected by the voltage detection circuit.

17. The battery pack according to claim 1, wherein the external device is (i) a charger or (ii) a battery-operated device.

18. The battery pack according to claim 1, wherein the control circuit is configured to operate the biasing circuit so as to vary the physical electrical resistance of the biasing circuit based at least on whether or not a measured temperature value of the rechargeable battery is below a threshold.

19. A method for adjusting charging and/or discharging between a battery pack and an external device comprising:

outputting a temperature signal from the battery pack to the external device, the temperature signal having a voltage associated with a variable resistance of a temperature detection device in the battery pack, the variable resistance being dependent on a temperature of (i) a rechargeable battery in the battery pack or (ii) at least one battery cell in the rechargeable battery, and the external device being coupled to the battery pack; and varying a physical electrical resistance distinct from the variable resistance of the temperature detection device to thereby bias the voltage of the temperature signal based on (i) a status of the rechargeable battery and/or (ii) a status of the at least one battery cell, wherein the voltage biased makes the external device reduce or stop (i) charging from the external device to the rechargeable battery and/or (ii) discharging from the rechargeable battery to the external device.

* * * * *